US 9,537,163 B2

United States Patent
Yoshimine

(10) Patent No.: US 9,537,163 B2
(45) Date of Patent: Jan. 3, 2017

(54) FUEL CELL SYSTEM AND METHOD OF CONTROLLING THE FUEL CELL SYSTEM

(71) Applicant: HONDA MOTOR CO., LTD., Tokyo (JP)

(72) Inventor: Yuki Yoshimine, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 99 days.

(21) Appl. No.: 14/416,902

(22) PCT Filed: Jun. 6, 2013

(86) PCT No.: PCT/JP2013/066281
§ 371 (c)(1),
(2) Date: Jan. 23, 2015

(87) PCT Pub. No.: WO2014/021001
PCT Pub. Date: Feb. 6, 2014

(65) Prior Publication Data
US 2015/0180066 A1 Jun. 25, 2015

(30) Foreign Application Priority Data

Aug. 2, 2012 (JP) ................................ 2012-172312

(51) Int. Cl.
*H01M 8/04* (2016.01)
*H01M 8/06* (2016.01)
(Continued)

(52) U.S. Cl.
CPC ............ *H01M 8/04373* (2013.01); *C01B 3/38* (2013.01); *H01M 8/04022* (2013.01);
(Continued)

(58) Field of Classification Search
CPC ............ H01M 8/04955; H01M 8/0662; H01M 8/04619; H01M 8/04373
See application file for complete search history.

(56) References Cited

U.S. PATENT DOCUMENTS

2010/0304235 A1\* 12/2010 Shigezumi .............. C01B 3/384
429/416
2010/0304241 A1\* 12/2010 Ooe ........................ C01B 3/384
429/423
(Continued)

FOREIGN PATENT DOCUMENTS

| EP | 2 256 849 A1 | 12/2010 |
| JP | 2001-052727 | 2/2001 |

(Continued)

OTHER PUBLICATIONS

Japanese Office Action dated Aug. 4, 2015 with partial English translation, 4 pages.
(Continued)

*Primary Examiner* — Stewart Fraser
(74) *Attorney, Agent, or Firm* — Rankin, Hill & Clark LLP

(57) ABSTRACT

A control device includes a combustion apparatus temperature comparison unit for comparing a temperature of a combustion apparatus and a combustion apparatus temperature range, a combustion apparatus flame-out determination unit for determining whether flame-out occurs in the combustion apparatus based on a comparison result by the combustion apparatus temperature comparison unit, and a combustion apparatus control unit for starting or stopping operation of a start-up combustor based on a determination result by the combustion apparatus flame-out determination unit.

16 Claims, 18 Drawing Sheets

(51) Int. Cl.
*H01M 8/24* (2016.01)
*C01B 3/38* (2006.01)
*H01M 8/12* (2016.01)

(52) U.S. Cl.
CPC ..... *H01M 8/0432* (2013.01); *H01M 8/04619* (2013.01); *H01M 8/04753* (2013.01); *H01M 8/04955* (2013.01); *H01M 8/0662* (2013.01); *H01M 8/24* (2013.01); *C01B 2203/0233* (2013.01); *C01B 2203/0811* (2013.01); *H01M 2008/1293* (2013.01); *Y02E 60/50* (2013.01); *Y02E 60/525* (2013.01)

(56) References Cited

U.S. PATENT DOCUMENTS

| | | | |
|---|---|---|---|
| 2012/0015262 A1* | 1/2012 | Watanabe | C01B 3/382 429/413 |
| 2012/0021307 A1* | 1/2012 | Watanabe | C01B 3/382 429/413 |
| 2012/0028143 A1* | 2/2012 | Akagi | C01B 3/382 429/423 |

FOREIGN PATENT DOCUMENTS

| | | |
|---|---|---|
| JP | 2003-223912 | 8/2003 |
| JP | 2005-166439 | 6/2005 |
| JP | 2011-070782 | 4/2011 |
| JP | 2012-038689 | 2/2012 |

OTHER PUBLICATIONS

International Search Report, Date of Mailing: Nov. 14, 2013 (Nov. 14, 2013).

\* cited by examiner

FIG. 7

| ST:STACK \ BT:COMBUSTOR | BELOW THE RANGE | WITHIN THE RANGE | ABOVE THE RANGE |
|---|---|---|---|
| BELOW THE RANGE | (e) IGNITION OR ASSISTANCE | (b) NO PROCESSING OR ASSISTANCE | (h) NO PROCESSING |
| WITHIN THE RANGE | (d) IGNITION OR ASSISTANCE | (a) NO PROCESSING | (g) NO PROCESSING |
| ABOVE THE RANGE | (f) STOP | (c) A/F ↑ | (i) UF ↑ OR A/F ↑ |

FUEL CELL SYSTEM AND METHOD OF CONTROLLING THE FUEL CELL SYSTEM

TECHNICAL FIELD

The present invention relates to a fuel cell system having a the fuel cell stack formed by stacking a plurality of fuel cells for generating electrical energy by electrochemical reactions of a fuel gas and an oxygen-containing gas. Further, the present invention relates a method of controlling the fuel cell system.

BACKGROUND ART

Typically, a solid oxide fuel cell (SOFC) employs a solid electrolyte of ion-conductive oxide such as stabilized zirconia. The electrolyte is interposed between an anode and a cathode to form an electrolyte electrode assembly, for example, a membrane electrode assembly (hereinafter also referred to as MEA). The electrolyte electrode assembly is interposed between separators (bipolar plates). In use, generally, predetermined numbers of the electrolyte electrode assemblies and the separators are stacked together to form a fuel cell stack.

As a fuel cell system including the fuel cell stack of this type, for example, a fuel cell power generation system disclosed in Japanese Laid-Open Patent Publication No. 2001-052727 (hereinafter referred to as conventional technique 1) is known. In the fuel cell power generation system, as shown in FIG. 16, after a fuel exhaust gas discharged from a fuel electrode 1a of a fuel cell body is utilized for heat exchange in a fuel preheater 2a, the fuel exhaust gas is mixed with a fuel supplied from the outside through a recycle line 3a, and utilized again. After an exhaust air discharged from an air electrode 4a of the fuel cell body is utilized for heat exchange in an air preheater 5a, the exhaust gas is mixed with the air supplied from the outside through a recycle line 6a, and utilized again.

Further, according to the disclosure, the remaining fuel exhaust gas and exhaust air are combusted in a combustor 7a, and the hot combustion exhaust gas in the combustor 7a contributes improvement in the power generation efficiency in exhaust gas power generation means 8a in a bottoming cycle.

Further, as shown in FIG. 17, a fuel cell system disclosed in Japanese Laid-Open Patent Publication No. 2005-166439 (hereinafter referred to as conventional technique 2) includes a start-up combustor 3b, an exhaust gas combustor 5b, and a heat exchanger 7b. At the time of starting operation of the fuel cell system, the start-up combustor 3b reforms or imperfectly combusts the fuel gas 1b supplied from the outside, and supplies the fuel gas as a reducing gas 2b to a fuel electrode. The exhaust gas combustor 5b combusts a fuel electrode off gas 4b discharged from the fuel electrode. The heat exchanger 7b heats air 6b using the heat produced in the exhaust gas combustor 5b.

Further, as shown in FIG. 18, a fuel cell disclosed in Japanese Laid-Open Patent Publication No. 2012-038689 (hereinafter referred to as conventional technique 3), includes a fuel cell stack 1c formed by stacking plate shaped solid oxide fuel cells as power generation units vertically and an air preheater 2c, a combustor 3c, and a reformer 4c provided on both sides of the fuel cell stack 1c in the vertical direction.

A burner 5c is provided below the reformer 4c for receiving a raw material gas and the air, and heating the fuel cell stack 1c, and these components are placed in a heat insulating container 6c.

SUMMARY OF INVENTION

In the conventional technique 1, after the fuel exhaust gas and the exhaust air are used in heat exchange in the fuel preheater 2a and the air preheater 5a, the fuel exhaust gas and the exhaust air are supplied to the combustor 7a. In the structure, the temperature of the exhaust gas (fuel exhaust gas and the exhaust air) supplied to the combustor 7a is decreased, and flame-out occurs easily. As a result, the exhaust gas which has not been combusted is discharged directly to the outside.

Further, in the conventional technique 2, though the exhaust gas combustor 5b is provided, when flame-out of the exhaust gas combustor 5b occurs, the problem of the flame-out cannot be solved suitably. Therefore, the exhaust gas which has not been combusted is discharged from the exhaust gas combustor 5b undesirably.

Further, in the conventional technique 3, the reformer 4c is provided between the combustor 3c and the burner 5c. Therefore, when the flame-out of the combustor 3c occurs, if the combustor 3c is heated by the burner 5c, the reformer 4c becomes excessively hot, and the performance of the reformer 4c may be degraded undesirably.

The present invention has been made to solve the problem of this type, and an object of the present invention is to provide a fuel cell system and a method of controlling the fuel cell system in which it is possible to facilitate thermally self-sustaining operation, and treat the exhaust gas suitably with simple structure and steps.

The present invention relates to a fuel cell system and a method of controlling the fuel cell system including a fuel cell stack formed by stacking a plurality of fuel cells for generating electrical energy by electrochemical reactions of a fuel gas and an oxygen-containing gas, a heat exchanger for raising a temperature of the oxygen-containing gas by heat exchange with a combustion gas, and supplying the oxygen-containing gas to the fuel cell stack, a combustion apparatus including an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas and a start-up combustor for combusting the fuel gas or raw fuel to be reformed into the fuel gas and the oxygen-containing gas to produce the combustion gas, and a control device for controlling an amount of electrical energy generated in the fuel cell stack.

In this fuel cell system, the control device includes a combustion apparatus temperature comparison unit for comparing a temperature of the combustion apparatus and a predetermined combustion apparatus temperature range, a combustion apparatus flame-out determination unit for determining whether flame-out occurs in the combustion apparatus based on a comparison result by the combustion apparatus temperature comparison unit, and a combustion apparatus control unit for starting or stopping operation of the start-up combustor based on a determination result by the combustion apparatus flame-out determination unit.

Further, the method of controlling the fuel cell system includes a combustion apparatus temperature comparing step of comparing a temperature of the combustion apparatus and a predetermined combustion apparatus temperature range, a combustion apparatus flame-out determining step of determining whether flame-out occurs in the combustion apparatus based on a comparison result obtained in the combustion apparatus temperature comparing step, and a start-up combustor controlling step of starting or stopping operation of the start-up combustor based on a determination result obtained in the combustion apparatus flame-out determining step.

In the present invention, when it is determined that flame-out of the combustion apparatus occurs based on the temperature of the combustion apparatus, operation of the start-up combustor is started. Therefore, the temperature of the combustion apparatus is increased, and the combustion apparatus can be kept within the optimum operating temperature range, and improvement in the thermally self-sustaining operation can be achieved. Thermally self-sustaining operation herein means operation where the operating temperature of the combustion apparatus is maintained using only heat energy generated in the combustion apparatus, without supplying additional heat from the outside. Further, since the fuel exhaust gas and the oxygen-containing exhaust gas are not discharged from the combustion apparatus directly, the adverse effect on the environment can be prevented as much as possible.

BRIEF DESCRIPTION OF DRAWINGS

FIG. 7 is a control map illustrating the control method;

DESCRIPTION OF EMBODIMENTS

Figure 1:
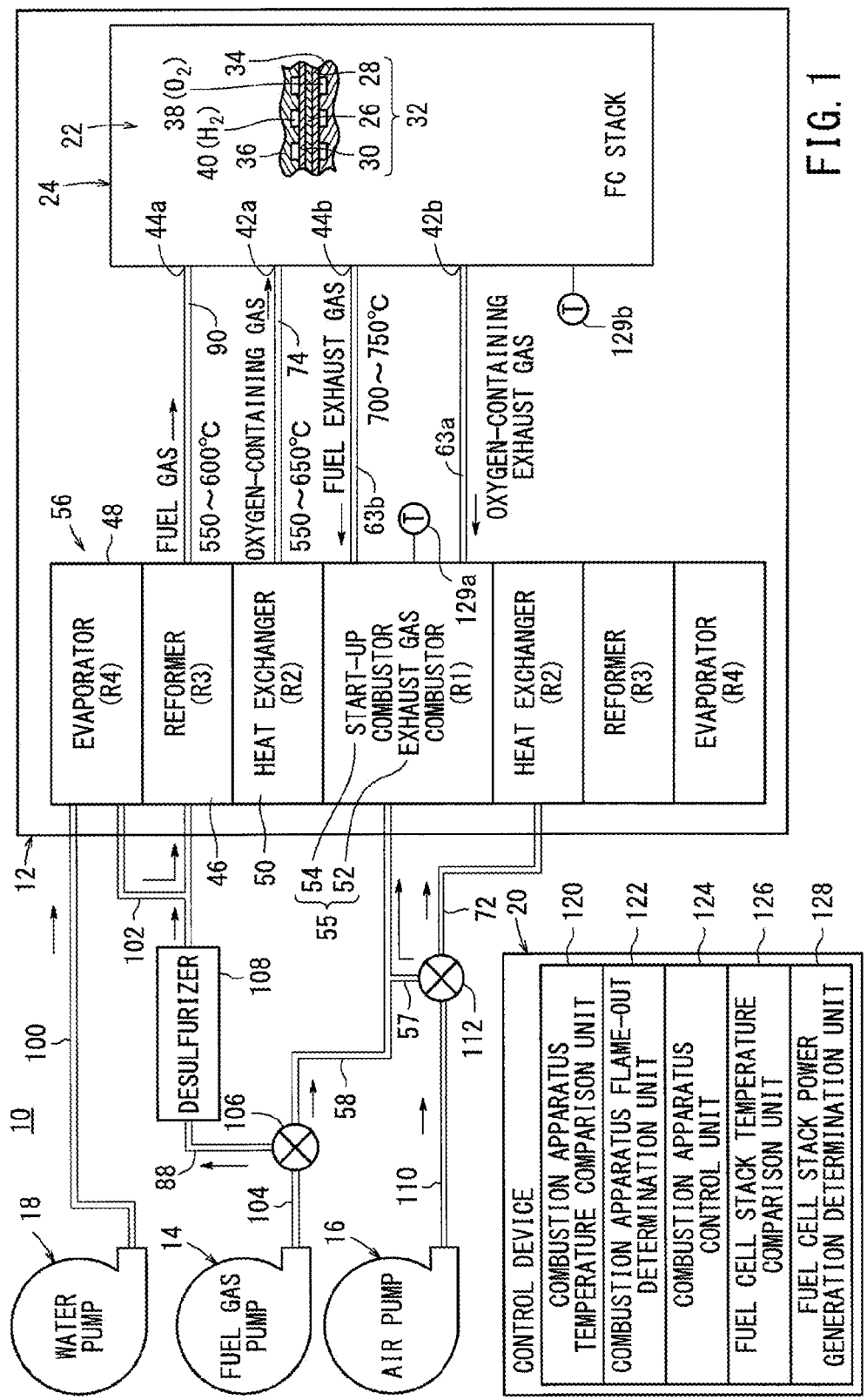
FIG. 1 is a diagram schematically showing structure of a fuel cell system according to a first embodiment of the present invention.

A fuel cell system 10 according to a first embodiment of the present invention shown in FIG. 1 is used in various applications, including stationary and mobile applications. For example, the fuel cell system 10 is mounted on a vehicle.

The fuel cell system 10 includes a fuel cell module (SOFC module) 12 for generating electrical energy in power generation by electrochemical reactions of a fuel gas (a gas produced by mixing a hydrogen gas, methane, and carbon monoxide) and an oxygen-containing gas (air), a raw fuel supply apparatus (including a fuel gas pump) 14 for supplying a raw fuel (e.g., city gas) to the fuel cell module 12, an oxygen-containing gas supply apparatus (including an air pump) 16 for supplying the oxygen-containing gas to the fuel cell module 12, a water supply apparatus (including a water pump) 18 for supplying water to the fuel cell module 12, and a control device 20 for controlling the amount of electrical energy generated in the fuel cell module 12.

The fuel cell module 12 includes a fuel cell stack 24 formed by stacking a plurality of solid oxide fuel cells 22 in a vertical direction (or horizontal direction). The fuel cell 22 includes an electrolyte electrode assembly (MEA) 32. The electrolyte electrode assembly 32 includes a cathode 28, an anode 30, and an electrolyte 26 interposed between the cathode 28 and the anode 30. For example, the electrolyte 26 is made of ion-conductive oxide such as stabilized zirconia.

A cathode side separator 34 and an anode side separator 36 are provided on both sides of the electrolyte electrode assembly 32. An oxygen-containing gas flow field 38 for supplying the oxygen-containing gas to the cathode 28 is formed in the cathode side separator 34, and a fuel gas flow field 40 for supplying the fuel gas to the anode 30 is formed in the anode side separator 36. As the fuel cell 22, various types of conventional SOFCs can be adopted.

The operating temperature of the fuel cell 22 is high, at several hundred ° C. Methane in the fuel gas is reformed at the anode 30 to obtain hydrogen and CO, and the hydrogen and CO are supplied to a portion of the electrolyte 26 adjacent to the anode 30.

An oxygen-containing gas supply passage 42a, an oxygen-containing gas discharge passage 42b, a fuel gas supply passage 44a, and a fuel gas discharge passage 44b extend through the fuel cell stack 24. The oxygen-containing gas supply passage 42a is connected to an inlet of each oxygen-containing gas flow field 38, the oxygen-containing gas discharge passage 42b is connected to an outlet of each oxygen-containing gas flow field 38, the fuel gas supply passage 44a is connected to an inlet of each fuel gas flow field 40, and the fuel gas discharge passage 44b is connected to an outlet of each fuel gas flow field 40.

The fuel cell module 12 includes a reformer 46 for reforming a mixed gas of a raw fuel chiefly containing hydrocarbon (e.g., city gas) and water vapor to produce a fuel gas supplied to the fuel cell stack 24, an evaporator 48 for evaporating water and supplying the water vapor to the reformer 46, a heat exchanger 50 for raising the temperature of the oxygen-containing gas by heat exchange with a combustion gas, and supplying the oxygen-containing gas to the fuel cell stack 24, and a combustion apparatus 55 including an exhaust gas combustor 52 for combusting the fuel gas discharged from the fuel cell stack 24 as a fuel exhaust gas and the oxygen-containing gas discharged from the fuel cell stack 24 as an oxygen-containing exhaust gas to produce the combustion gas and a start-up combustor 54 for combusting the raw fuel and the oxygen-containing gas to produce the combustion gas.

Basically, the fuel cell module 12 is made up of the fuel cell stack 24 and FC (fuel cell) peripheral equipment 56. The FC peripheral equipment 56 includes the reformer 46, the evaporator 48, the heat exchanger 50, and the combustion apparatus 55 (the exhaust gas combustor 52 and the start-up combustor 54). The reformer 46 and the evaporator 48 may be provided as necessary. The reformer 46 and the evaporator 48 may not be provided. In this case, instead of the raw fuel supply apparatus 14, a fuel gas supply apparatus (not shown) for directly supplying the fuel gas containing a hydrogen gas can be used.

Figure 2:
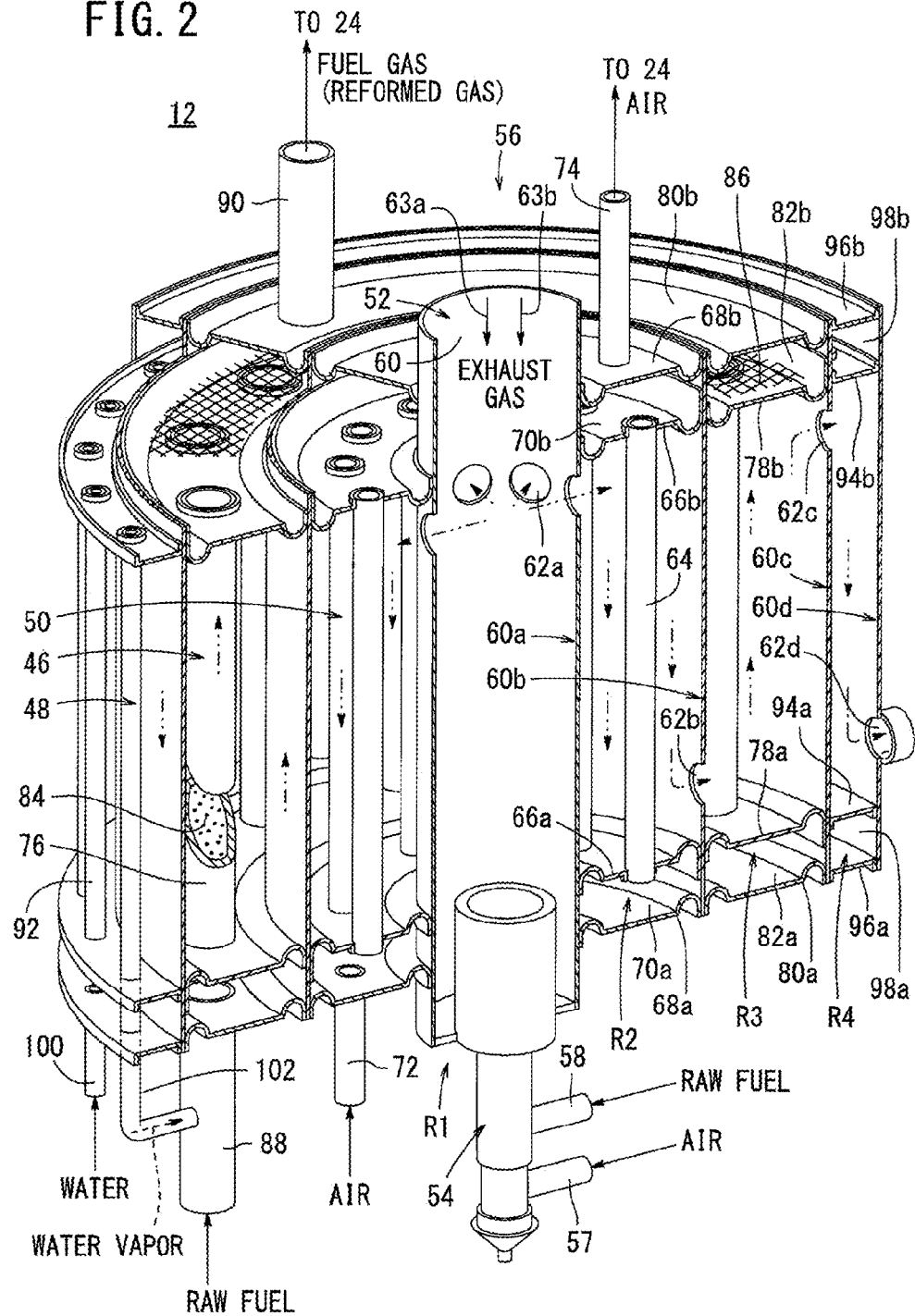
FIG. 2 is a perspective view with partial omission showing FC peripheral equipment of the fuel cell system.

As shown in FIG. 2, the FC peripheral equipment 56 includes a first area R1 comprising, e.g., a circular opening where the exhaust gas combustor 52 and the start-up combustor 54 (the combustion apparatus 55) are provided, an annular second area R2 formed around the first area R1 where the heat exchanger 50 is provided, an annular third area R3 formed around the second area R2 where the reformer 46 is provided, and an annular fourth area R4 formed around the third area R3 where the evaporator 48 is provided.

Figure 3:
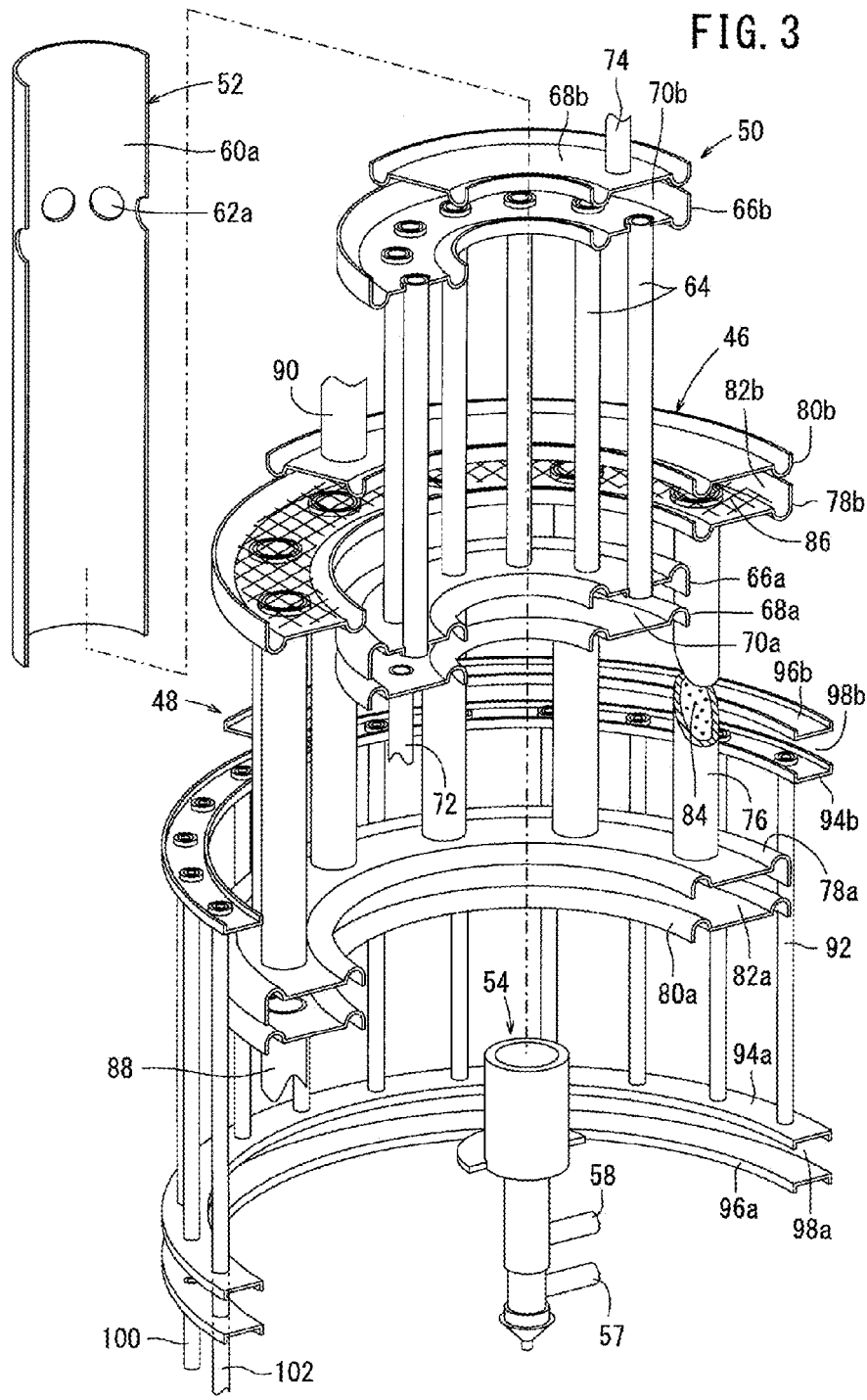
FIG. 3 is an exploded perspective view showing main components of the FC peripheral equipment.

As shown in FIGS. 2 and 3, the start-up combustor 54 includes an air supply pipe 57 and a raw fuel supply pipe 58. The start-up combustor 54 has an ejector function, and generates negative pressure in the raw fuel supply pipe 58 by the flow of the air supplied from the air supply pipe 57 for sucking the raw fuel.

Figure 4:
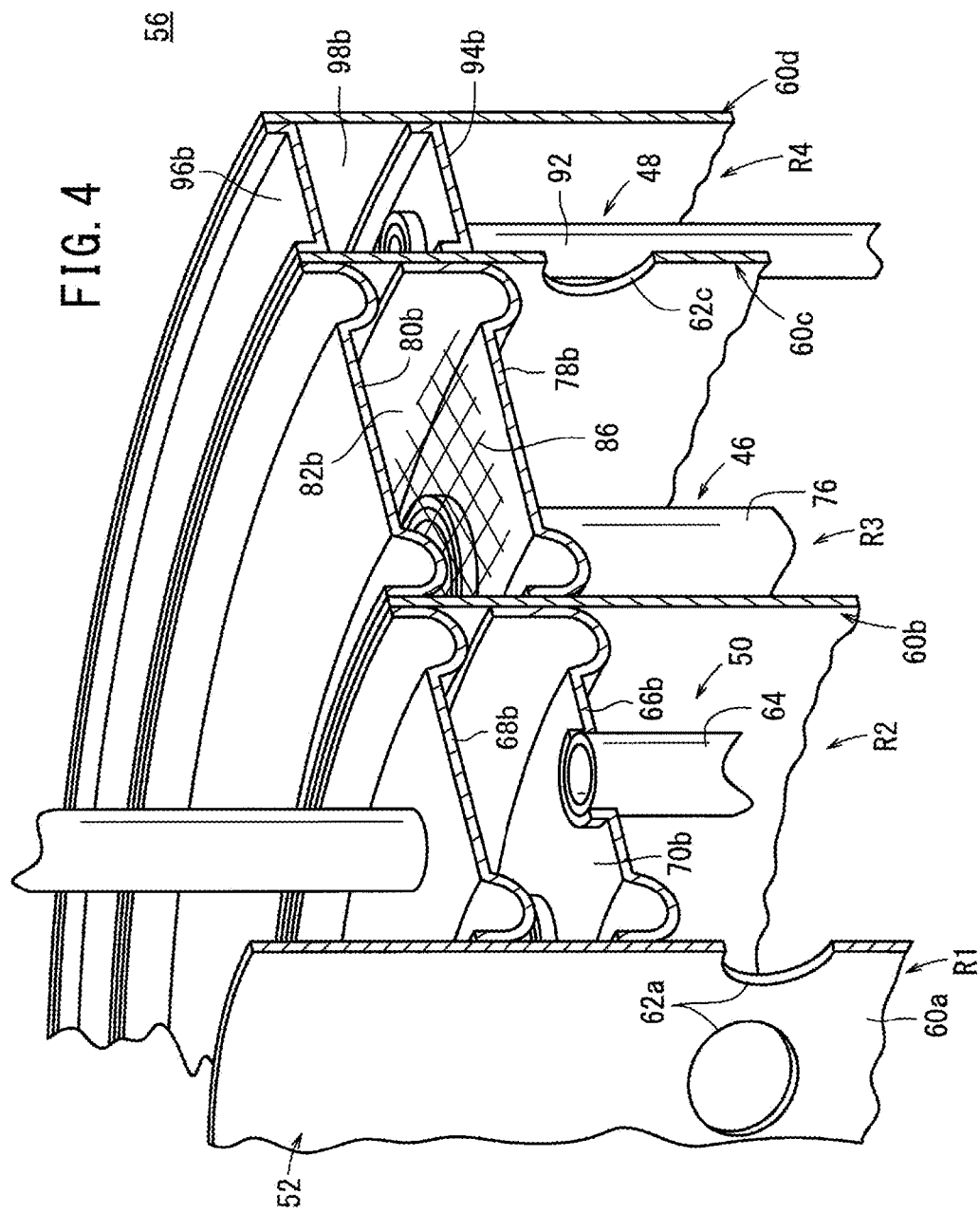
FIG. 4 is an enlarged perspective view showing main components of the FC peripheral equipment.

As shown in FIGS. 2 and 4, the FC peripheral equipment 56 includes a first partition plate 60a provided between the first area R1 and the second area R2, a second partition plate 60b provided between the second area R2 and the third area R3, and a third partition plate 60c provided between the third area R3 and the fourth area R4. A fourth partition plate 60d as an outer plate is provided around the fourth area R4.

As shown in FIGS. 2 and 3, the exhaust gas combustor 52 is provided inside the first partition plate 60a containing the start-up combustor 54. The first partition plate 60a has a cylindrical shape, and a plurality of first combustion gas holes 62a are formed along the outer circumferential portion of the first partition plate 60a, adjacent to an end of the first partition plate 60a closer to the fuel cell stack 24.

A plurality of second combustion gas holes 62b are formed adjacent to an end of the second partition plate 60b opposite to the fuel cell stack 24. A plurality of third combustion gas holes 62c are formed adjacent to an end of the third partition plate 60c closer to the fuel cell stack 24. A plurality of fourth combustion gas holes 62d are formed adjacent to an end of the fourth partition plate 60d opposite to the fuel cell stack 24. The combustion gas is discharged to the outside through the fourth combustion gas holes 62d.

One end of an oxygen containing exhaust gas channel 63a and one end of a fuel exhaust gas channel 63b are provided at the first partition plate 60a. The combustion gas is produced inside the first partition plate 60a by combustion reaction of the fuel gas (specifically, fuel exhaust gas) and the oxygen-containing gas (specifically, oxygen-containing exhaust gas).

As shown in FIG. 1, the other end of the oxygen-containing exhaust gas channel 63a is connected to the oxygen-containing gas discharge passage 42b of the fuel cell stack 24, and the other end of the fuel exhaust gas channel 63b is connected to the fuel gas discharge passage 44b of the fuel cell stack 24.

As shown in FIGS. 2 and 3, the heat exchanger 50 includes a plurality of heat exchange pipes (heat transmission pipes) 64 provided around the first partition plate 60a. The heat exchange pipes 64 are fixed to a first inner ring 66a at one end and the end opposite to the fuel cell stack 24: hereinafter, in the same manner, the end opposite to the fuel cell stack 24 is referred to as one end), and the heat exchange pipes 64 are fixed to a first inner ring 66b at the other end (one end closer to the fuel cell stack 24: hereinafter, in the same manner, one end closer to the fuel cell stack 24 is referred to as the other end).

A first outer ring 68a is provided outside the first inner ring 66a, and a first outer ring 68b is provided outside the first inner ring 66b. The first inner rings 66a, 66b and the first outer rings 68a, 68b are fixed to the outer circumferential surface of the first partition plate 60a and the inner circumference surface of the second partition plate 60b.

An annular oxygen-containing gas supply chamber 70a is formed between the first inner ring 66a and the first outer ring 68a, and the oxygen-containing gas is supplied to the oxygen-containing gas supply chamber 70a. An annular oxygen-containing gas discharge chamber 70b is formed between the first inner ring 66b and the first outer ring 68b, and the heated oxygen-containing gas is discharged to the oxygen-containing gas discharge chamber 70b (see FIGS. 2 to 4). Both ends of each of the heat exchange pipes 64 are opened to the oxygen-containing gas supply chamber 70a and the oxygen-containing gas discharge chamber 70b.

An oxygen-containing gas supply pipe 72 is provided in the oxygen-containing gas supply chamber 70a. One end of an oxygen-containing gas channel 74 is provided in the oxygen-containing gas discharge chamber 70b, and the other end of the oxygen-containing gas channel 74 is connected to the oxygen-containing gas supply passage 42a of the fuel cell stack 24 (see FIG. 1).

The reformer 46 is a preliminary reformer for reforming higher hydrocarbon ($C_{2+}$) such as ethane ($C_2H_6$), propane ($C_3H_8$), and butane ($C_4H_{10}$) in the city gas (raw fuel) to produce the fuel gas chiefly containing methane ($CH_4$), hydrogen, and CO by steam reforming. The operating temperature of the reformer 46 is several hundred ° C.

As shown in FIGS. 2 and 3, the reformer 46 includes a plurality of reforming pipes (heat transmission pipes) 76 provided around the heat exchanger 50. The reforming pipes 76 are fixed to a second inner ring 78a at one end, and fixed to a second inner ring 78b at the other end.

A second outer ring 80a is provided outside the second inner ring 78a, and a second outer ring 80b is provided outside the second inner ring 78b. The second inner rings 78a, 78b and the second outer rings 80a, 80b are fixed to the outer circumferential surface of the second partition plate 60b and the inner circumferential surface of the third partition plate 60c.

An annular mixed gas supply chamber 82a is formed between the second inner ring 78a and the second outer ring 80a, and a mixed gas of raw fuel and water vapor is supplied to the mixed gas supply chamber 82a. An annular reformed gas discharge chamber 82b is formed between the second inner ring 78b and the second outer ring 80b, and the produced fuel gas (reformed gas) is discharged to the reformed gas discharge chamber 82b.

Both ends of each of the reforming pipes 76 are opened to the mixed gas supply chamber 82a and the reformed gas discharge chamber 82b. Each of the reforming pipes 76 is filled with reforming catalyst pellets 84. Metal meshes 86 are provided at both ends of the reforming pipes 76 for supporting the catalyst pellets 84.

A raw fuel supply channel 88 is connected to the mixed gas supply chamber 82a, and an evaporation return pipe 102 described later is connected to a position somewhere in the raw fuel supply channel 88. One end of a fuel gas channel 90 is connected to the reformed gas discharge chamber 82b, and the other end of the fuel gas channel 90 is connected to the fuel gas supply passage 44a of the fuel cell stack 24 (see FIG. 1).

The evaporator 48 includes a plurality of evaporation pipes (heat transmission pipes) 92 provided around the reformer 46. The evaporation pipes 92 are fixed to a third inner ring 94a at one end, and fixed to a third inner ring 94b at the other end.

A third outer ring 96a is provided outside the third inner ring 94a, and a third outer ring 96b is provided outside the third inner ring 94b. The third inner rings 94a, 94b and the third outer rings 96a, 96b are fixed to the outer circumferential surface of the third partition plate 60c and the inner circumferential surface of the fourth partition plate 60d.

An annular water supply chamber 98a is formed between the third inner ring 94a and the third outer ring 96a, and water is supplied to the water supply chamber 98a. An annular water vapor discharge chamber 98b is formed between the third inner ring 94b and the third outer ring 96b, and water vapor is discharged to the water vapor discharge chamber 98b. Both ends of each of the evaporation pipes 92 are opened to the water supply chamber 98a and the water vapor discharge chamber 98b.

A water channel 100 is connected to the water supply chamber 98a. One end of the evaporation return pipe 102 having at least one evaporation pipe 92 is provided in the water vapor discharge chamber 98b, and the other end of the evaporation return pipe 102 is connected to a position somewhere in the raw fuel supply channel 88 (see FIG. 1). The raw fuel supply channel 88 has an ejector function, and generates negative pressure by the flow of the raw fuel for sucking the water vapor.

As shown in FIG. 1, the raw fuel supply apparatus 14 includes a raw fuel channel 104. The raw fuel channel 104 is branched into the raw fuel supply channel 88 and the raw fuel supply pipe 58 through a raw fuel regulator valve 106. A desulfurizer 108 for removing sulfur compounds in the city gas (raw fuel) is provided in the raw fuel supply channel 88.

The oxygen-containing gas supply apparatus 16 includes an oxygen-containing gas channel 110. The oxygen-containing gas channel 110 is branched into the oxygen-containing gas supply pipe 72 and the air supply pipe 57 through an oxygen-containing gas regulator valve 112. The water supply apparatus 18 is connected to the evaporator 48 through the water channel 100.

Figure 5:
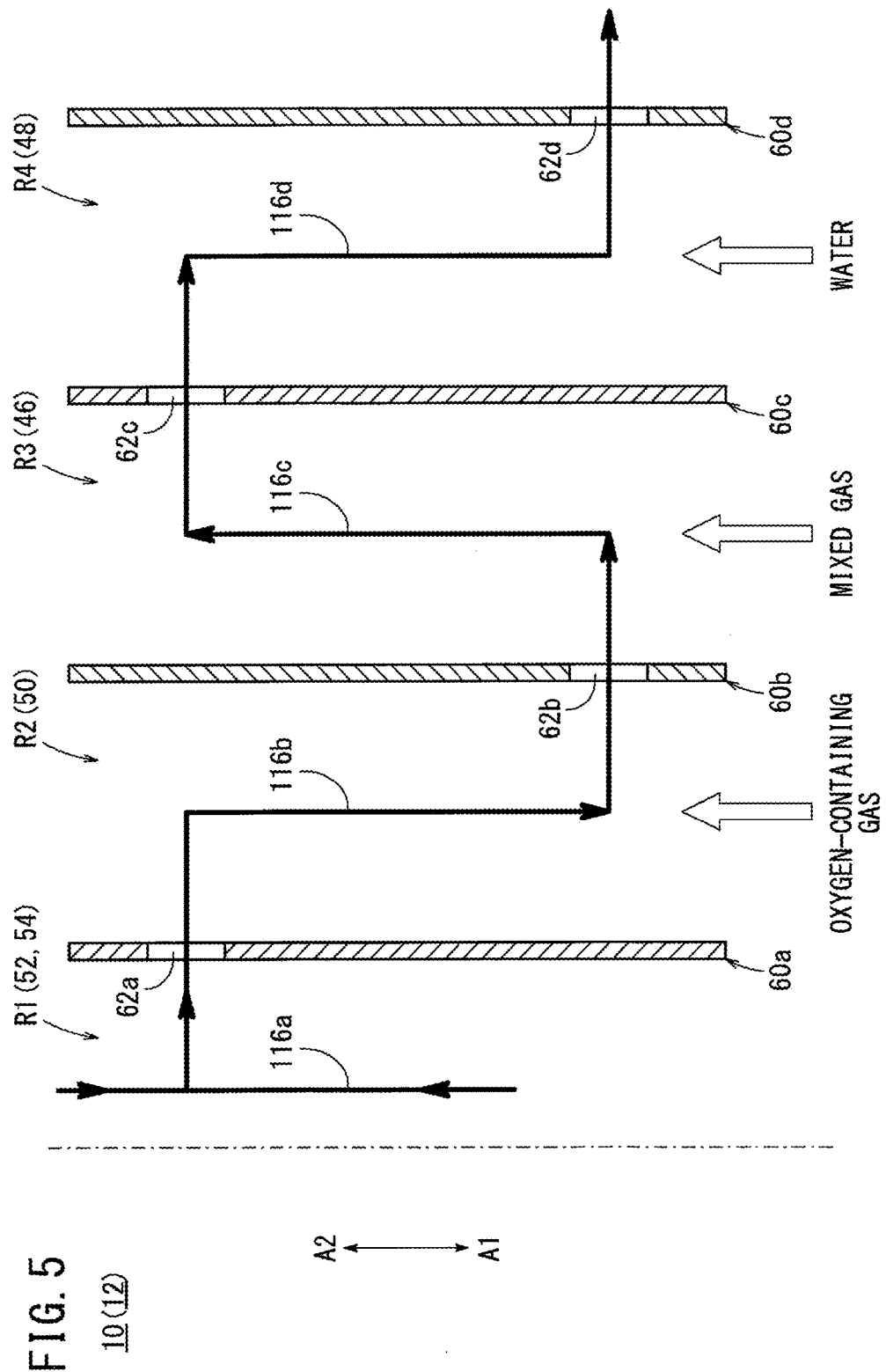
FIG. 5 is a view showing gas flows of a combustion gas in the FC peripheral equipment.

As schematically shown in FIG. 5, a first combustion gas channel 116a as a passage of the combustion gas is formed in the first area R1, a second combustion gas channel 116b as a passage of the combustion gas in a direction indicated by an arrow A1 is formed in the second area R2, a third combustion gas channel 116c as a passage of the combustion gas in a direction indicated by an arrow A2 is formed in the third area R3, and a fourth combustion gas channel 116d as a passage of the combustion gas in the direction indicated by the arrow A1 is formed in the fourth area R4.

As shown in FIG. 1, the control device 20 includes a combustion apparatus temperature comparison unit 120 for comparing the temperature of the combustion apparatus 55 and a predetermined combustion apparatus temperature range, a combustion apparatus flame-out determination unit 122 for determining whether flame-out occurs in the combustion apparatus 55 based on the comparison result by the combustion apparatus temperature comparison unit 120 and a combustion apparatus control unit 124 for starting or stopping operation of the start-up combustor 54 based on the determination result by the combustion apparatus flame-out determination unit 122.

Further, the control device 20 includes a fuel cell stack temperature comparison unit 126 for comparing the temperature of the fuel cell stack 24 and a predetermined fuel cell stack temperature range, a fuel cell stack power generation determination unit 128 for determining whether the fuel cell stack 24 has a temperature where power generation of the fuel cell stack 24 can be performed based on the comparison result by the fuel cell stack temperature comparison unit 126. The combustion apparatus control unit 124 starts or stops operation of the start-up combustor 54 based on the determination result by the fuel cell stack power generation determination unit 128.

The combustion apparatus 55 is equipped with a first temperature detector 129a such as a thermocouple for detecting the temperature in the combustion apparatus 55. The fuel cell stack 24 is equipped with a second temperature detector 129b such as a thermocouple for detecting the temperature in the fuel cell stack 24.

Next, operation of the fuel cell system 10 will be described below.

At the time of starting operation of the fuel cell system 10, the air (oxygen-containing gas) and the raw fuel are supplied to the start-up combustor 54. Specifically, by operation of the air pump, the air is supplied to the oxygen-containing gas channel 110. By adjusting the opening angle of the oxygen-containing gas regulator valve 112, the air is supplied to the air supply pipe 57.

In the meanwhile, in the raw fuel supply apparatus 14, by operation of the fuel gas pump, for example, raw fuel such as the city gas (containing $CH_4$, $C_2H_6$, $C_3H_8$, $C_4H_{10}$) is supplied to the raw fuel channel 104. By regulating the opening angle of the raw fuel regulator valve 106, the raw fuel is supplied into the raw fuel supply pipe 58. The raw fuel is mixed with the air, and supplied into the start-up combustor 54 (see FIG. 2).

Thus, the mixed gas of the raw fuel and the air is supplied into the start-up combustor 54, and the mixed gas is ignited to start combustion. Therefore, in the exhaust gas combustor 52 directly connected to the start-up combustor 54, the combustion gas from the start-up combustor 54 flows into the first partition plate 60a.

As shown in FIG. 5, the plurality of first combustion gas holes 62a are formed near the end of the first partition plate 60a closer to the fuel cell stack 24. Thus, the combustion gas supplied into the first partition plate 60a passes through the first combustion gas holes 62a, and the combustion gas flows from the first area R1 to the second area R2.

In the second area R2, the combustion gas flows in the direction indicated by the arrow A1, and then, the combustion gas flows through the second combustion gas holes 62b formed in the second partition plate 60b into the third area R3. In the third area R3, the combustion gas flows in the direction indicated by the arrow A2, and then, the combustion gas flows through the third combustion gas holes 62c formed in the third partition plate 60c into the fourth area R4. In the fourth area R4, the combustion gas flows in the direction indicated by the arrow A1, and then, the combustion gas is discharged to the outside from the fourth combustion gas holes 62d formed in the fourth partition plate 60d.

The heat exchanger 50 is provided in the second area R2, the reformer 46 is provided in the third area R3, and the evaporator 48 is provided in the fourth area R4. Thus, the combustion gas discharged from the first area R1 heats the heat exchanger 50, then, heats the reformer 46, and then, heats the evaporator 48.

Then, after the temperature of the fuel cell module 12 is increased to a predetermined temperature, the oxygen-containing gas is supplied to the heat exchanger 50, and the mixed gas of the raw fuel and the water vapor is supplied to the reformer 46.

Specifically, as shown in FIG. 1, the opening angle of the oxygen-containing gas regulator valve 112 is adjusted such that the flow rate of the air supplied to the oxygen-containing gas supply pipe 72 is increased, and the opening angle of the raw fuel regulator valve 106 is adjusted such that the flow rate of the raw fuel supplied to the raw fuel supply channel 88 is increased. Further, by operation of the water supply apparatus 18, the water is supplied to the water channel 100.

Thus, as shown in FIGS. 2 and 3, the air which flowed into the heat exchanger 50 is temporarily supplied to the oxygen-containing gas supply chamber 70$a$. While the air is moving inside the heat exchange pipes 64, the air is heated by heat exchange with the combustion gas supplied into the second area R2. After the heated air is temporarily supplied to the oxygen-containing gas discharge chamber 70$b$, the air is supplied to the oxygen-containing gas supply passage 42$a$ of the fuel cell stack 24 through the oxygen-containing gas channel 74 (see FIG. 1).

In the fuel cell stack 24, after the heated air flows through the oxygen-containing gas flow field 38, the oxygen-containing gas is discharged from the oxygen-containing gas discharge passage 42$b$ into the oxygen-containing exhaust gas channel 63$a$. The oxygen-containing exhaust gas channel 63$a$ is opened to the inside of the first partition plate 60$a$ of the exhaust gas combustor 52, and the oxygen-containing exhaust gas flows into the first partition plate 60$a$.

Further, as shown in FIG. 1, the water from the water supply apparatus 18 is supplied to the evaporator 48. After sulfur is removed from the raw fuel at the desulfurizer 108, the raw fuel flows through the raw fuel supply channel 88, and moves toward the reformer 46.

In the evaporator 48, after the water is temporarily supplied to the water supply chamber 98$a$, while water is moving inside the evaporation pipes 92, the water is heated by the combustion gas flowing through the fourth area R4, and vaporized. After the water vapor flows into the water vapor discharge chamber 98$b$, the water vapor is supplied to the evaporation return pipe 102 connected to the water vapor discharge chamber 98$b$. Thus, the water vapor flows inside the evaporation return pipe 102, and flows into the raw fuel supply channel 88. Then, the water vapor is mixed with the raw fuel to produce the mixed gas.

The mixed gas from the raw fuel supply channel 88 is temporarily supplied to the mixed gas supply chamber 82$a$ of the reformer 46. The mixed gas moves inside the reforming pipes 76. In the meanwhile, the mixed gas is heated by the combustion gas flowing through the third area R3, and steam reforming is induced by the catalyst pellets 84. After removal (reforming) of hydrocarbon of $C_{2+}$, a reformed gas chiefly containing methane is obtained.

After this reformed gas is heated, the reformed gas is temporarily supplied to the reformed gas discharge chamber 82$b$ as the fuel gas. Thereafter, the fuel gas is supplied to the fuel gas supply passage 44$a$ of the fuel cell stack 24 through the fuel gas channel 90 (see FIG.

In the fuel cell stack 24, after the heated fuel gas flows through the fuel gas flow field 40, the fuel gas is discharged from the fuel gas discharge passage 44$b$ into the fuel exhaust gas channel 63$b$. The fuel exhaust gas channel 63$b$ is opened to the inside of the first partition plate 60$a$ of the exhaust gas combustor 52, and the fuel exhaust gas is supplied into the first partition plate 60$a$.

Under the heating operation by the start-up combustor 54, when the temperature of the fuel gas in the exhaust gas combustor 52 exceeds the self-ignition temperature, combustion of the oxygen-containing exhaust gas and the fuel exhaust gas is started inside the first partition plate 60$a$.

Figure 6:
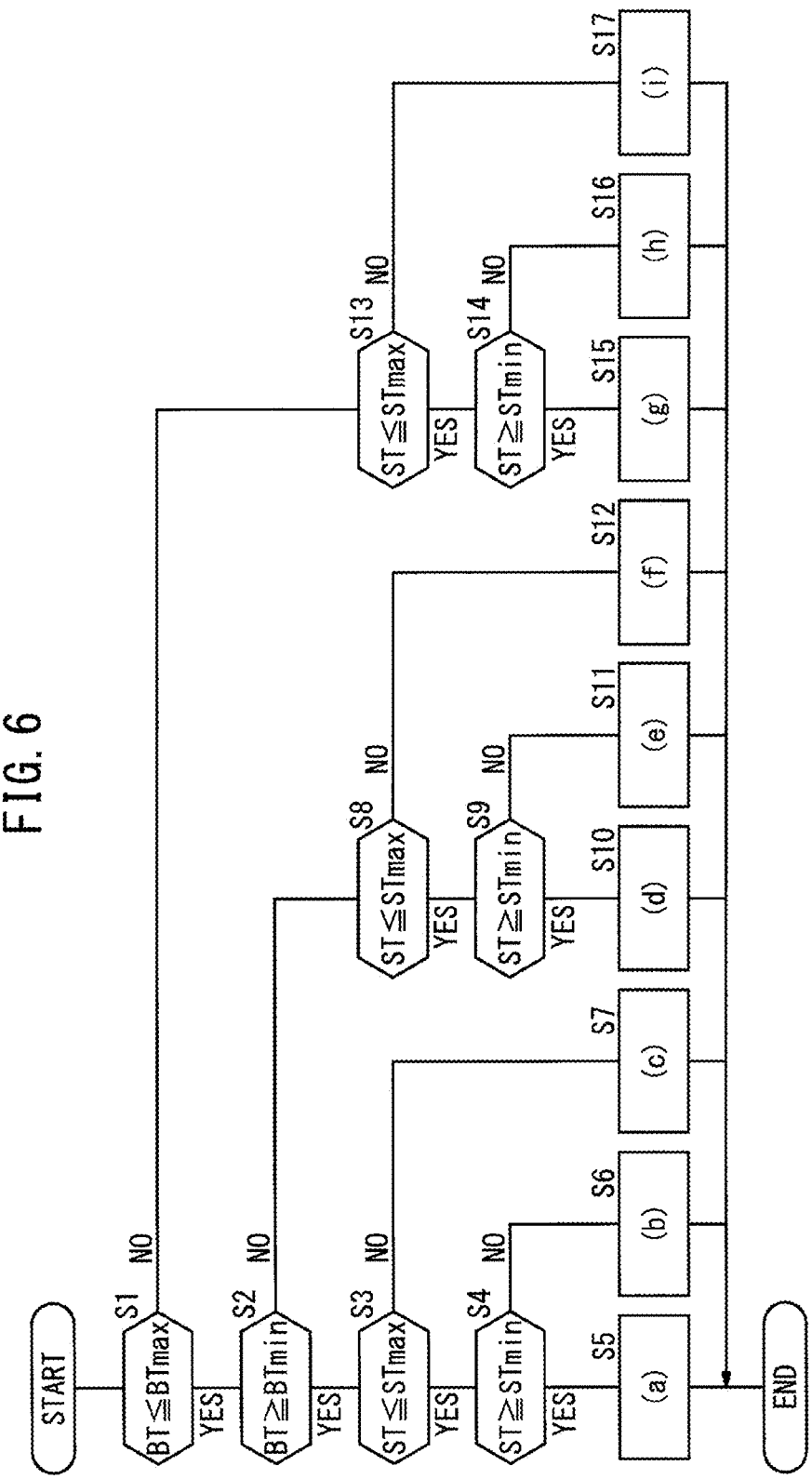
FIG. 6 is a flow chart illustrating a method of controlling the fuel cell system.

Next, a control method according to the first embodiment will be described below with reference to a flow chart shown in FIG. 6 and a control map shown in FIG. 7.

Firstly, for a temperature BT of the combustion apparatus 55, a minimum setting temperature BTmin is determined beforehand as a lower limit temperature, and a maximum setting temperature BTmax is determined beforehand as an upper limit temperature. For example, the minimum setting temperature BTmin is 750° C., and the maximum setting temperature BTmax is 1150° C.

For a temperature ST of the fuel cell stack 24, a minimum setting temperature STmin is determined beforehand as a lower limit temperature, and a maximum setting temperature STmax is determined beforehand as an upper limit temperature. For example, the minimum setting temperature STmin is 650° C., and the maximum setting temperature STmax is 800° C.

As described above, during operation (power generation) of the fuel cell system 10, the control device 20 detects the temperature of the combustion apparatus 55 by the first temperature detector 129$a$, and detects the temperature of the fuel cell stack 24 by the second temperature detector 129$b$.

In step S1, it is determined whether the temperature BT of the combustion apparatus 55 is the maximum setting temperature BTmax or less (combustion apparatus temperature comparing step). In the combustion apparatus temperature comparison unit 120, if it is determined that the temperature BT of the combustion apparatus 55 is the maximum setting temperature BTmax or less (YES in step S1), the control proceeds to step S2 for determining whether the temperature BT is the minimum setting temperature BTmin or more.

If it is determined that the temperature BT is the minimum setting temperature BTmin or more (YES in step S2), i.e., if it is determined that the temperature BT is within a range between the minimum setting temperature BTmin and the maximum setting temperature Btmax (BTmin BT≤BTmax), the control proceeds to step S3.

In step S3, it is determined whether the temperature ST of the fuel cell stack 24 is the maximum setting temperature STmax or less (fuel cell stack temperature comparing step). In the fuel cell stack temperature comparison unit 126, if it is determined that the temperature ST of the fuel cell stack 24 is the maximum setting temperature STmax or less (YES in step S3), the control proceeds to step S4 for determining whether the temperature ST is the minimum setting temperature STmin or more.

If it is determined that the temperature ST is the minimum setting temperature STmin or more (YES in step S4), i.e., if it is determined that the temperature ST of the fuel cell stack 24 is within a range between the minimum setting temperature STmin and the maximum setting temperature STmax (STmin≤ST≤STmax), the control proceeds to step S5. In step S5, no processing for the combustion apparatus 55 is performed (see FIG. 7). It is because the combustion apparatus 55 and the fuel cell stack 24 are kept within the optimum operating temperature range.

In step S4, if it is determined that the temperature ST of the fuel cell stack 24 is less than the minimum setting temperature STmin (NO in step S4), the control proceeds to step S6. At this time, it is determined that the temperature BT of the combustion apparatus 55 is within the operating temperature range, and the temperature ST of the fuel cell stack 24 is less than the operating temperature range. In step S6, a step where no processing for the combustion apparatus 55 is performed and a step of starting operation of the start-up combustor 54 to heat the fuel gas and the oxygen-containing gas supplied to the fuel cell stack 24 for providing assistance to increase the temperature of the fuel cell stack 24 are performed selectively (see FIG. 7).

Further, in step S3, if it is determined that the temperature ST of the fuel cell stack 24 exceeds the maximum setting temperature STmax (NO in step S3), the control proceeds to step S7. In step S7, the flow rate of the oxygen-containing gas supplied to the fuel cell stack 24 is increased, or the flow rate of the fuel gas supplied to the fuel cell stack 24 is decreased (see FIG. 7). Thus, the A/F (oxygen-containing gas/fuel gas) rate is increased, and the temperature ST of the fuel cell stack 24 can be decreased.

In step S2, if it is determined that the temperature BT of the combustion apparatus 55 is less than the minimum setting temperature BTmin (NO in step S2), the control proceeds to step S8. In step S8, in the same manner as in the case of step S3, it is determined whether the temperature ST of the fuel cell stack 24 is the maximum setting temperature STmax or less. If it is determined that the temperature ST is the maximum setting temperature STmax or less (YES in step S8), the control proceeds to step S9.

In step S9, in the same manner as in the case of the step S4, if it is determined that the temperature ST of the fuel cell stack 24 is the minimum setting temperature STmin or more (YES in step S9), the control proceeds to step S10. If it is determined that the temperature ST is less than the minimum setting temperature STmin (NO in step S9), the control proceeds to step S11.

In steps S10 and S11, as shown in FIG. 7, the combustion apparatus 55 is less than the operating temperature range. Therefore, in either of the cases, operation of the start-up combustor 54 is started, and the ignition process and the assistance process by heating of the fuel gas and the oxygen-containing gas are performed selectively.

In step S8, if it is determined that the temperature ST of the fuel cell stack 24 exceeds the maximum setting temperature STmax (NO in step S8), the control proceeds to step S12, and operation of the fuel cell system 10 is stopped. It is because malfunctioning in the components of the fuel cell system 10 is detected since the temperature ST of the fuel cell stack 24 exceeds the operating temperature range, and the temperature BT of the combustion apparatus 55 is below the operating temperature range.

In step S1, if it is determined that the temperature BT of the combustion apparatus 55 exceeds the maximum setting temperature BTmax (NO in step S1), the control proceeds to the process of step S13 and the subsequent steps. If it is determined that the temperature ST of the fuel cell stack 24 is between the minimum setting temperature STmin and the maximum setting temperature STmax (YES in step S13 and YES in step S14), the control proceeds to step S15.

Further, if it is determined that the temperature ST of the fuel cell stack 24 is less than the minimum setting temperature STmin (No in step S14), the control proceeds to step S16. In steps S15 and S16, as shown in FIG. 7, since the combustion apparatus 55 has the excessive temperature, no processing is performed.

Further, in step S13, if it is determined that the temperature ST of the fuel cell stack 24 exceeds the maximum setting temperature STmax (NO in step S13), the control proceeds to step S17.

In step S17, at least any of the process of increasing the fuel utilization ratio and the process of increasing the A/F ratio is performed (see FIG. 7). Specifically, the flow rate of the oxygen-containing gas supplied to the fuel cell stack 24 is increased or the flow rate of the fuel gas supplied to the fuel cell stack 24 is decreased to increase the A/F ratio. Further, the flow rate of the fuel gas supplied to the fuel cell stack 24 is decreased or the amount of electrical energy generated in the fuel cell stack 24 is increased to increase the fuel utilization ratio.

In the first embodiment, the control device 20 includes the combustion apparatus temperature comparison unit 120 for comparing the temperature of the combustion apparatus 55 and the predetermined combustion apparatus temperature range, the combustion apparatus flame-out determination unit 122 for determining whether flame-out occurs in the combustion apparatus 55 based on the comparison result by the combustion apparatus temperature comparison unit 120, and the combustion apparatus control unit 124 for starting or stopping operation of the start-up combustor 54 based on the determination result by the combustion apparatus flame-out determination unit 122.

Thus, if it is determined that the temperature BT of the combustion apparatus 55 is less than the minimum setting temperature BTmin (NO in step S2), in the control device 20, the combustion apparatus flame-out determination unit 122 determines that flame-out of the combustion apparatus 55 occurs. Therefore, if the temperature ST of the fuel cell stack 24 is the maximum setting temperature STmax or less (YES in step S8), operation of the start-up combustor 54 is started by the combustion apparatus control unit 124 (steps S10 and S11).

By starting operation of the start-up combustor 54, the temperature of the combustion apparatus 55 is increased, and the combustion apparatus 55 can be kept within the optimum temperature range. In this manner, improvement in the thermally self-sustaining operation of the combustion apparatus 55 can be achieved. Thermally self-sustaining operation herein means operation where the operating temperature of the combustion apparatus 55 is maintained using only heat energy generated in the combustion apparatus 55, without supplying additional heat from the outside.

Further, since the fuel exhaust gas and the oxygen-containing exhaust gas are not discharged from the combustion apparatus 55 without being used in the combustion, the adverse effect on the environment can be prevented as much as possible.

Further, the control device 20 includes the fuel cell stack temperature comparison unit 126 for comparing the temperature of the fuel cell stack 24 and the predetermined fuel cell stack temperature range, and the fuel cell stack power generation determination unit 128 for determining whether the fuel cell stack 24 has a temperature where power generation of the fuel cell stack 24 can be performed based on the comparison result by the fuel cell stack temperature comparison unit 126.

If the temperature ST of the fuel cell stack 24 is less than the fuel cell stack temperature range (NO in step S4), operation of the start-up combustor 54 is started to increase the temperature ST of the fuel cell stack 24 (step S6).

If the temperature ST of the fuel cell stack 24 exceeds the fuel cell stack temperature range (NO in step S8), operation of the start-up combustor 54 is stopped to decrease the temperature ST of the fuel cell stack 24 (step S12). In this manner, the temperature ST of the fuel cell stack 24 can be kept within the optimum operating temperature range, and improvement in the thermally self-sustaining operation is achieved. Thermally self-sustaining operation herein means operation where the operating temperature of the fuel cell stack 24 is maintained using only heat energy generated in the fuel cell stack 24, without supplying additional heat from the outside.

Further, in the first embodiment, when it is detected that the temperature BT of the combustion apparatus 55 is less than the minimum setting temperature BTmin (NO in step S2) in the combustion apparatus temperature comparing step and it is detected that the temperature ST of the fuel cell stack 24 is the maximum setting temperature STmax or less in the fuel cell stack temperature comparing step (YES in step S8), operation of the start-up combustor 54 is started in the start-up combustor controlling step (steps S10 and S11).

Thus, by starting operation of the start-up combustor 54, the temperature BT of the combustion apparatus 55 and the temperature ST of the fuel cell stack 24 can be increased. In this manner, the combustion apparatus 55 and the fuel cell stack 24 can be kept within the optimum operating temperature range, and improvement in the thermally self-sustaining operation is achieved. Further, since the fuel exhaust gas and the oxygen-containing exhaust gas are not discharged from the combustion apparatus 55 directly (without being combusted), the adverse effect on the environment can be prevented as much as possible.

Further, when it is detected that the temperature BT of the combustion apparatus 55 is between the minimum setting temperature BTmin and the maximum setting temperature BTmax in the combustion apparatus temperature comparing step (YES in step S2), and it is detected that the temperature ST of the fuel cell stack 24 is less than the minimum setting temperature STmin in the fuel cell stack temperature comparing step (NO in step S4), operation of the start-up combustor 54 is started in the start-up combustor controlling step (step S6).

Thus, by starting operation of the start-up combustor 54, the temperature ST of the fuel cell stack 24 can be increased. In this manner, the combustion apparatus 55 and the fuel cell stack 24 can be kept within the optimum operating temperature range, and improvement in the thermally self-sustaining operation is achieved. Further, since the fuel exhaust gas and the oxygen-containing exhaust gas are not discharged from the combustion apparatus 55 directly, the adverse effect on the environment can be prevented as much as possible.

Further, when it is detected that the temperature BT of the combustion apparatus 55 is between the minimum setting temperature BTmin and the maximum setting temperature BTmax in the combustion apparatus temperature comparing step (YES in step S2), and it is detected that the temperature ST of the fuel cell stack 24 exceeds the maximum setting temperature STmax in the fuel cell stack temperature comparing step (NO in step S3), the flow rate of the oxygen-containing gas supplied to the fuel cell stack 24 is increased, or the flow rate of the fuel gas supplied to the fuel cell stack 24 is decreased (step S7).

Thus, the A/F (oxygen-containing gas/fuel gas) ratio is increased, and the temperature ST of the fuel cell stack 24 can be decreased. In this manner, the fuel cell stack 24 and the combustion apparatus 55 can be kept within the optimum operating temperature range, and improvement in the thermally self-sustaining operation is achieved. Further, since the fuel exhaust gas and the oxygen-containing exhaust gas are not discharged from the combustion apparatus 55 directly, the adverse effect on the environment can be prevented as much as possible.

Further, when it is detected that the temperature BT of the combustion apparatus 55 exceeds the maximum setting temperature BTmax in the combustion apparatus temperature comparing step (NO in step S1) and it is detected that the temperature ST of the fuel cell stack 24 exceeds the maximum setting temperature STmax in the fuel cell stack temperature comparing step (NO in step S13), the flow rate of the oxygen-containing gas supplied to the fuel cell stack 24 is increased or the flow rate of the fuel gas supplied to the fuel cell stack 24 is decreased (step S17).

Thus, the A/F (oxygen-containing gas/fuel gas) ratio is increased, and the temperature ST of the fuel cell stack 24 and the temperature BT of the combustion apparatus 55 can be decreased. In this manner, the fuel cell stack 24 and the combustion apparatus 55 can be kept within the optimum operating temperature range, and improvement in the thermally self-sustaining operation is achieved. Further, since the fuel exhaust gas and the oxygen-containing exhaust gas are not discharged from the combustion apparatus 55 directly, the adverse effect on the environment can be prevented as much as possible.

Further, when it is detected that the temperature BT of the combustion apparatus 55 exceeds the maximum setting temperature BTmax in the combustion apparatus temperature comparing step (NO in step S1) and it is detected that the temperature ST of the fuel cell stack 24 exceeds the maximum setting temperature STmax in the fuel cell stack temperature comparing step (NO in step S13), the flow rate of the fuel gas supplied to the fuel cell stack 24 is decreased or the amount of electrical energy generated in the fuel cell stack 24 is increased (step S17).

Thus, the fuel utilization rate is increased, and the temperature ST of the fuel cell stack 24 and the temperature BT of the combustion apparatus 55 can be decreased. In this manner, the fuel cell stack 24 and the combustion apparatus 55 can be kept within the optimum operating temperature range, and improvement in the thermally self-sustaining operation is achieved. Further, since the fuel exhaust gas and the oxygen-containing exhaust gas are not discharged directly from the combustion apparatus 55, the adverse effect on the environment can be prevented as much as possible.

Further, the fuel cell stack 24 is a solid oxide fuel cell stack. Therefore, the fuel cell stack 24 is applicable to high temperature type fuel stacks such as SOFC.

Figure 8:
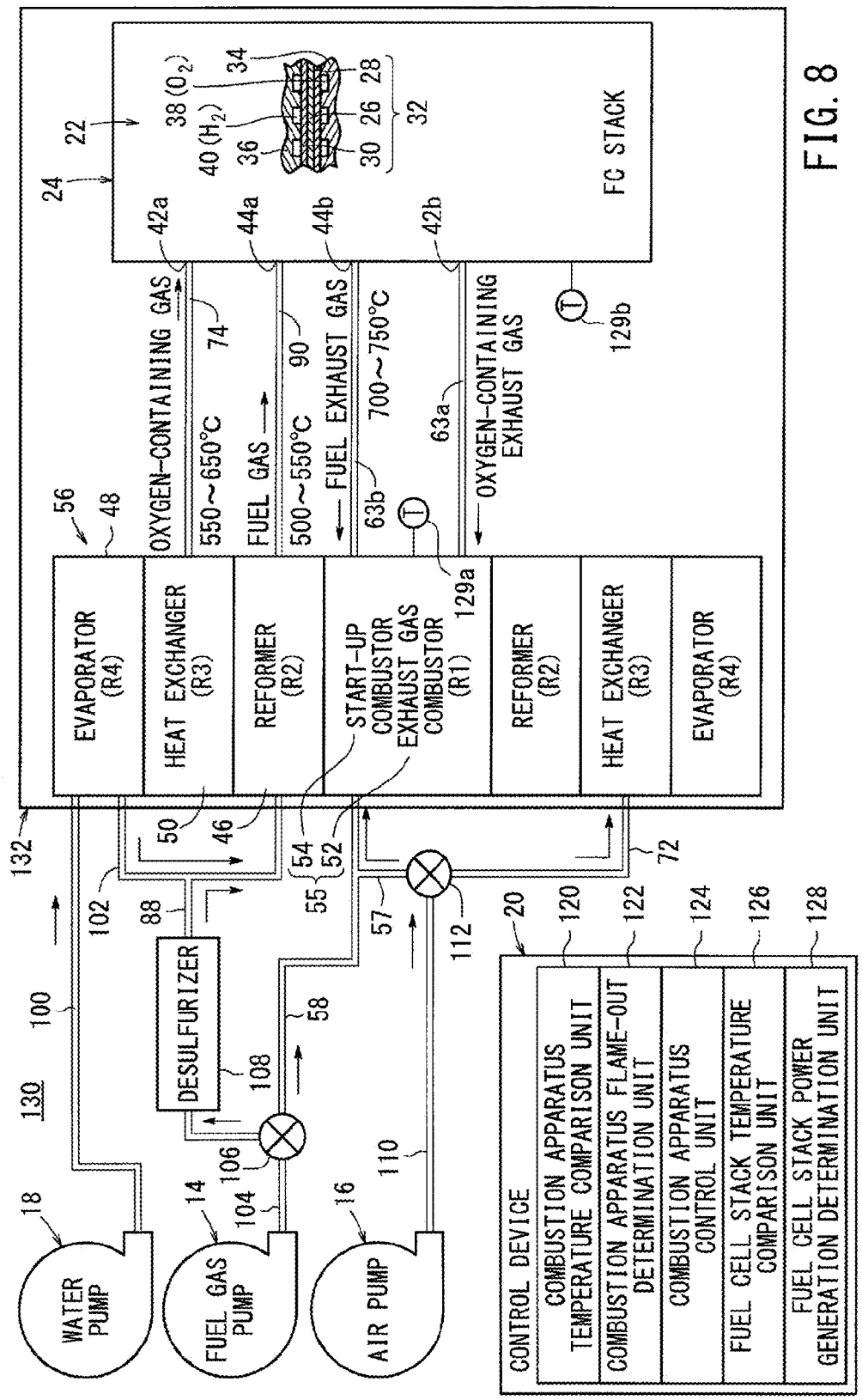
FIG. 8 is a diagram schematically showing structure of a fuel cell system according to a second embodiment of the present invention.

FIG. 8 is a view showing a fuel cell system 130 according to a second embodiment of the present invention. The constituent elements of the fuel cell system 130 according to the second embodiment of the present invention that are identical to those of the fuel cell system 10 according to the first embodiment are labeled with the same reference numerals, and descriptions thereof will be omitted. Also, the constituent elements of the fuel cell system according to a third embodiment described later that are identical to those of the fuel cell system 10 according to the first embodiment are labeled with the same reference numerals, and descriptions thereof will be omitted.

Figure 9:
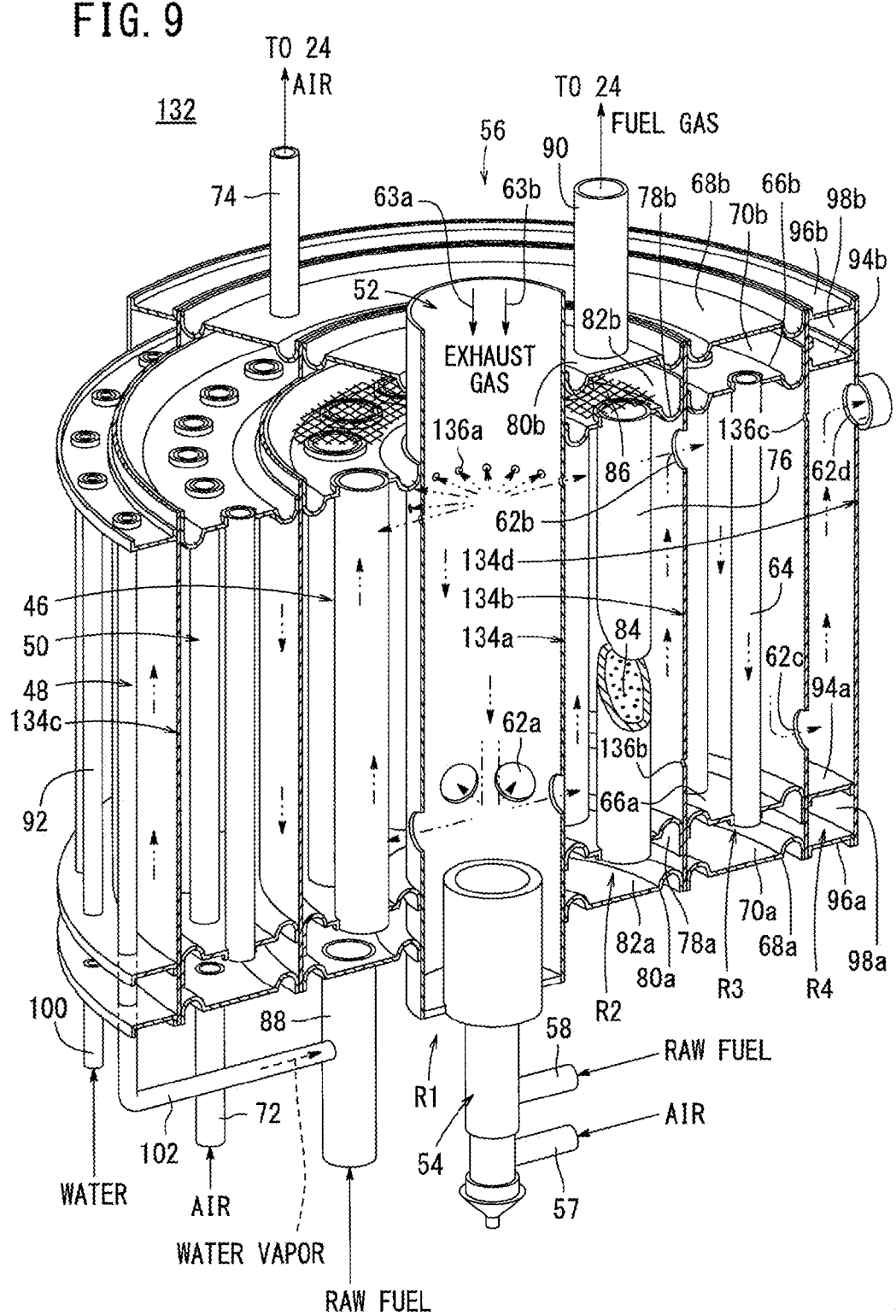
FIG. 9 is a perspective view with partial omission showing FC peripheral equipment of the fuel cell system.

As shown in FIG. 9, a fuel cell module 132 of the fuel cell system 130 includes a first area R1 comprising, e.g., a circular opening where an exhaust gas combustor 52 and a start-up combustor 54 are provided, an annular second area R2 around the first area R1 where the reformer 46 is provided, an annular third area R3 around the second area R2 where the heat exchanger 50 is provided, and an annular fourth area R4 around the third area R3 where an evaporator 48 is provided.

The FC peripheral equipment 56 includes a first partition plate 134a provided between the first area R1 and the second area R2, a second partition plate 134b provided between the second area R2 and the third area R3, a third partition plate 134c provided between the third area R3 and the fourth area R4, and a fourth partition plate 134d provided around the fourth area R4.

Figure 10:
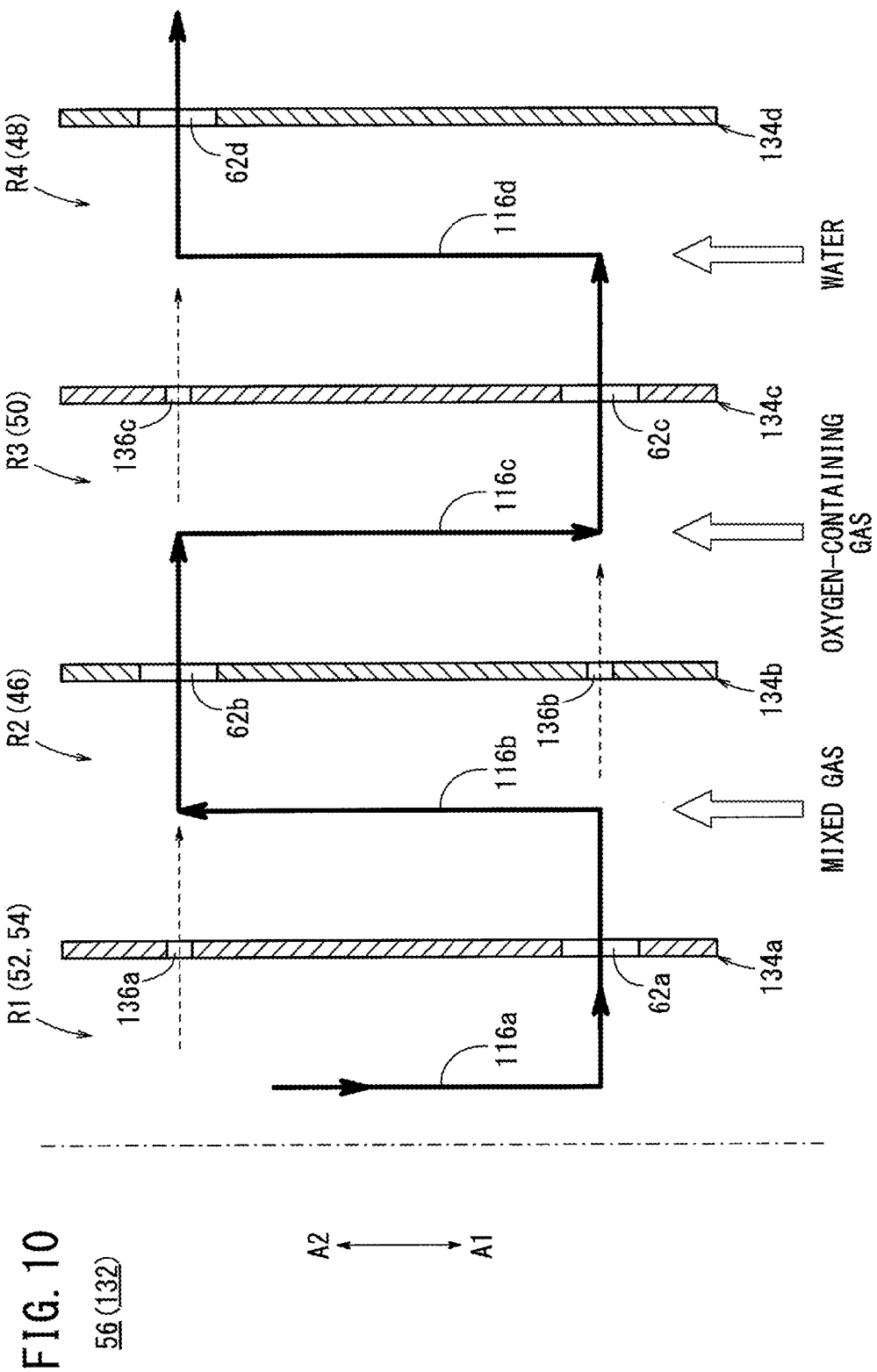
FIG. 10 is a view showing gas flows of a combustion gas in the FC peripheral equipment.

As shown in FIGS. 9 and 10, first combustion gas holes 62a are provided adjacent to the end of the first partition plate 134a opposite to the fuel cell stack 24, second combustion gas holes 62b are provided adjacent to the end of the second partition plate 134b closer to the fuel cell stack 24, third combustion gas holes 62c are provided adjacent to the end of the third partition plate 134c opposite to the fuel cell stack 24, and fourth combustion gas holes 62d are provided adjacent to the end of the fourth partition plate 134d closer to the fuel cell stack 24.

A plurality of gas extraction holes 136a are formed in the first partition plate 134a opposite to the first combustion gas holes 62a. As shown in FIG. 10, each of the gas extraction holes 136a has an opening which is smaller than that of the first combustion gas holes 62a. The gas extraction holes 136a are formed at positions facing the second combustion gas holes 62b formed in the second partition plate 134b. A plurality of gas extraction holes 136b are formed in the second partition plate 134b at positions facing the third combustion gas holes 62c formed in the third partition plate 134c. A plurality of gas extraction holes 136c are formed in the third partition plate 134c at positions facing the fourth combustion gas holes 62d formed in the fourth partition plate 134d. The gas extraction holes 136b, 136c are not essential, and should be provided as necessary.

In the second embodiment, control is implemented in the same manner as in the case of the first embodiment using the control device 20. Thus, if it is determined that flame-out of the combustion apparatus 55 occurs based on the temperature of the combustion apparatus 55, operation of the start-up combustor 54 is started. Accordingly, in this manner, the combustion apparatus 55 and the fuel cell stack 24 can be kept within the desired operating temperature range, and improvement in the thermally self-sustaining operation is achieved. Further, the same advantages as in the case of the first embodiment are obtained. For example, since the fuel exhaust gas and the oxygen-containing exhaust gas are not discharged directly from the combustion apparatus 55, the adverse effect on the environment can be prevented as much as possible.

Figure 11:
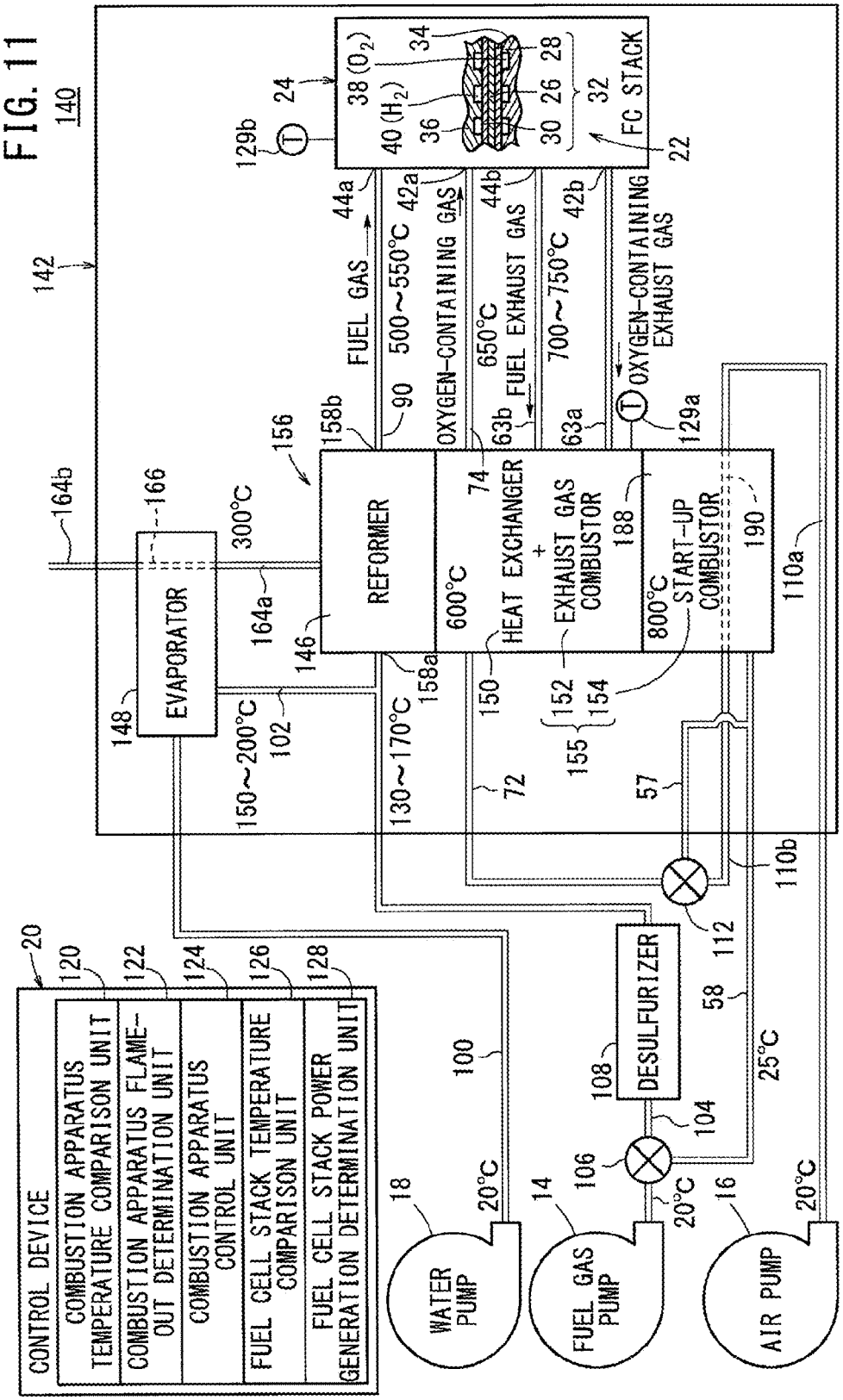
FIG. 11 is a diagram schematically showing structure of a fuel cell system according to a third embodiment of the present invention.

FIG. 11 shows a fuel cell system 140 according to a third embodiment of the present invention.

The fuel cell system 140 includes a fuel cell module (SOFC module) 142, and the fuel cell module 142 includes a reformer 146, an evaporator 148, a heat exchanger 150, and a combustion apparatus 155 including an exhaust gas combustor 152 and a start-up combustor 154.

Basically, the fuel cell module 142 includes a fuel cell stack 24 and FC peripheral equipment 156. The FC peripheral equipment 156 includes the reformer 146, the evaporator 148, the heat exchanger 150 and the combustion apparatus 155 (the exhaust gas combustor 152 and the start-up combustor 154). As described later, no exhaust gas pipes are provided between the reformer 146, the heat exchanger 150, the exhaust gas combustor 152, and the start-up combustor 154.

In the FC peripheral equipment 156, the exhaust gas combustor 152 is provided integrally in the heat exchanger 150, and the start-up combustor 154 is provided adjacent to one end of the heat exchanger 150. The reformer 146 is provided adjacent to the other end of the heat exchanger 150.

Figure 12:
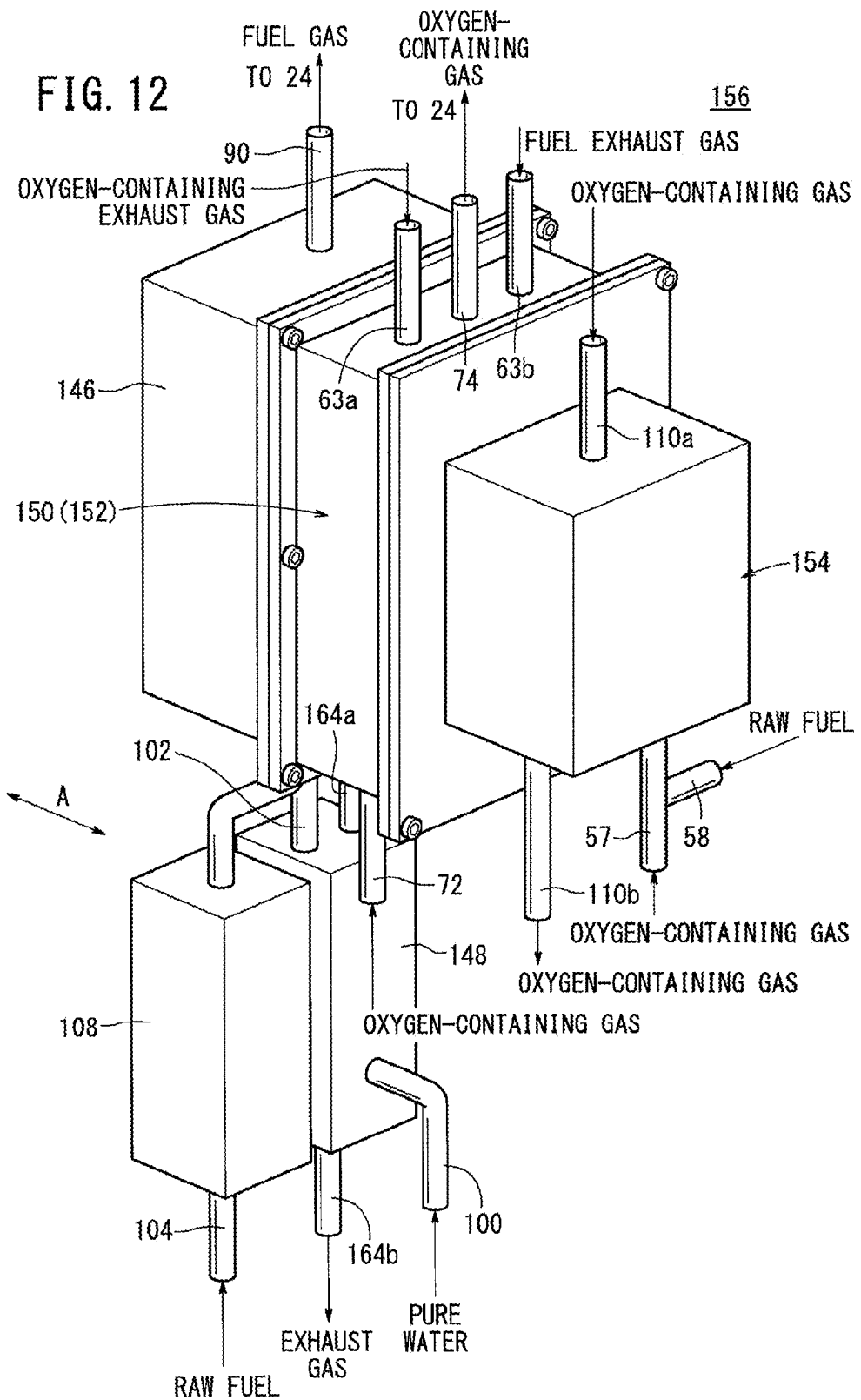
FIG. 12 is a perspective view schematically showing FC peripheral equipment of the fuel cell system.
Figure 13:
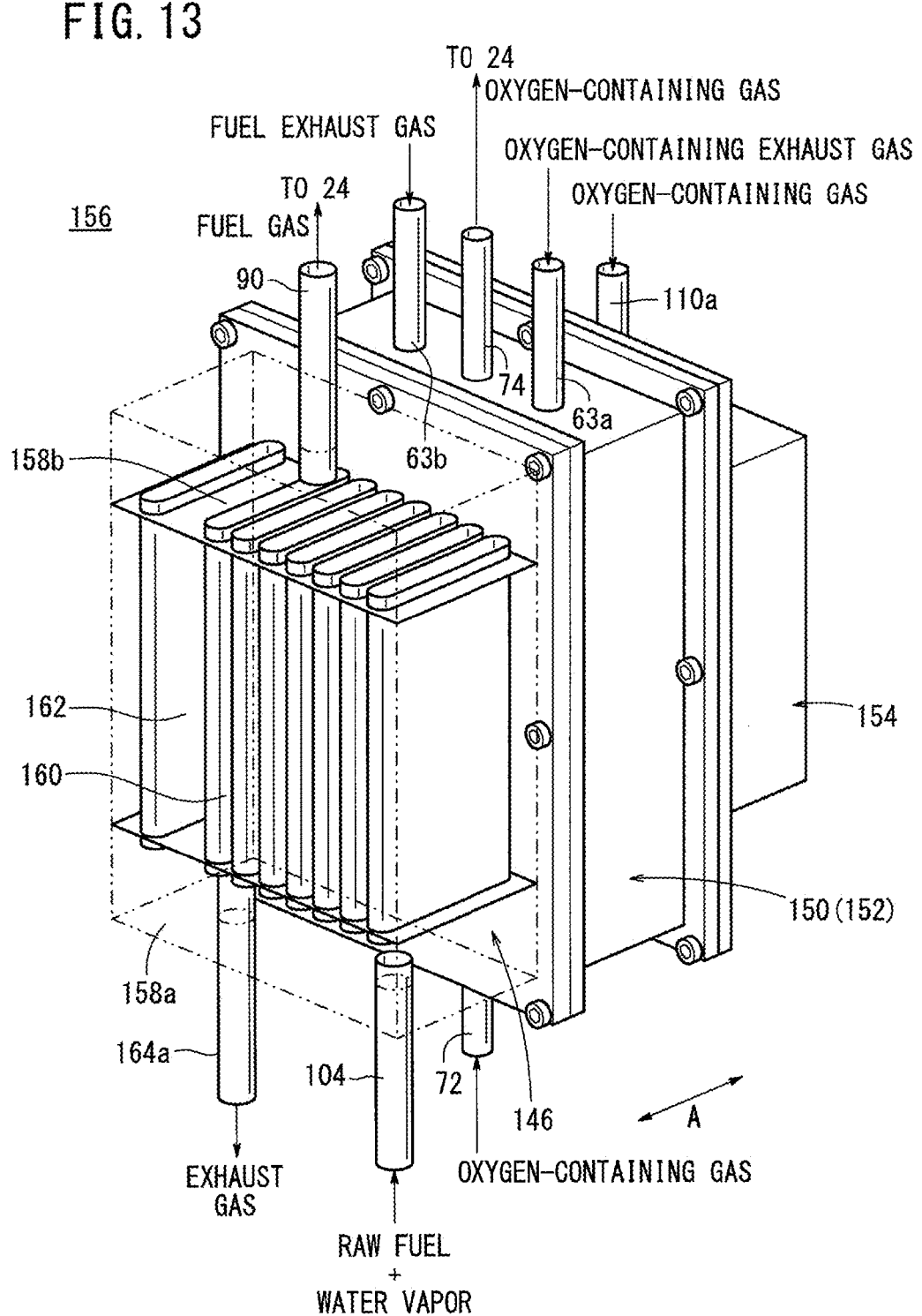
FIG. 13 is a perspective view schematically showing main components of the FC peripheral equipment.
Figure 14:
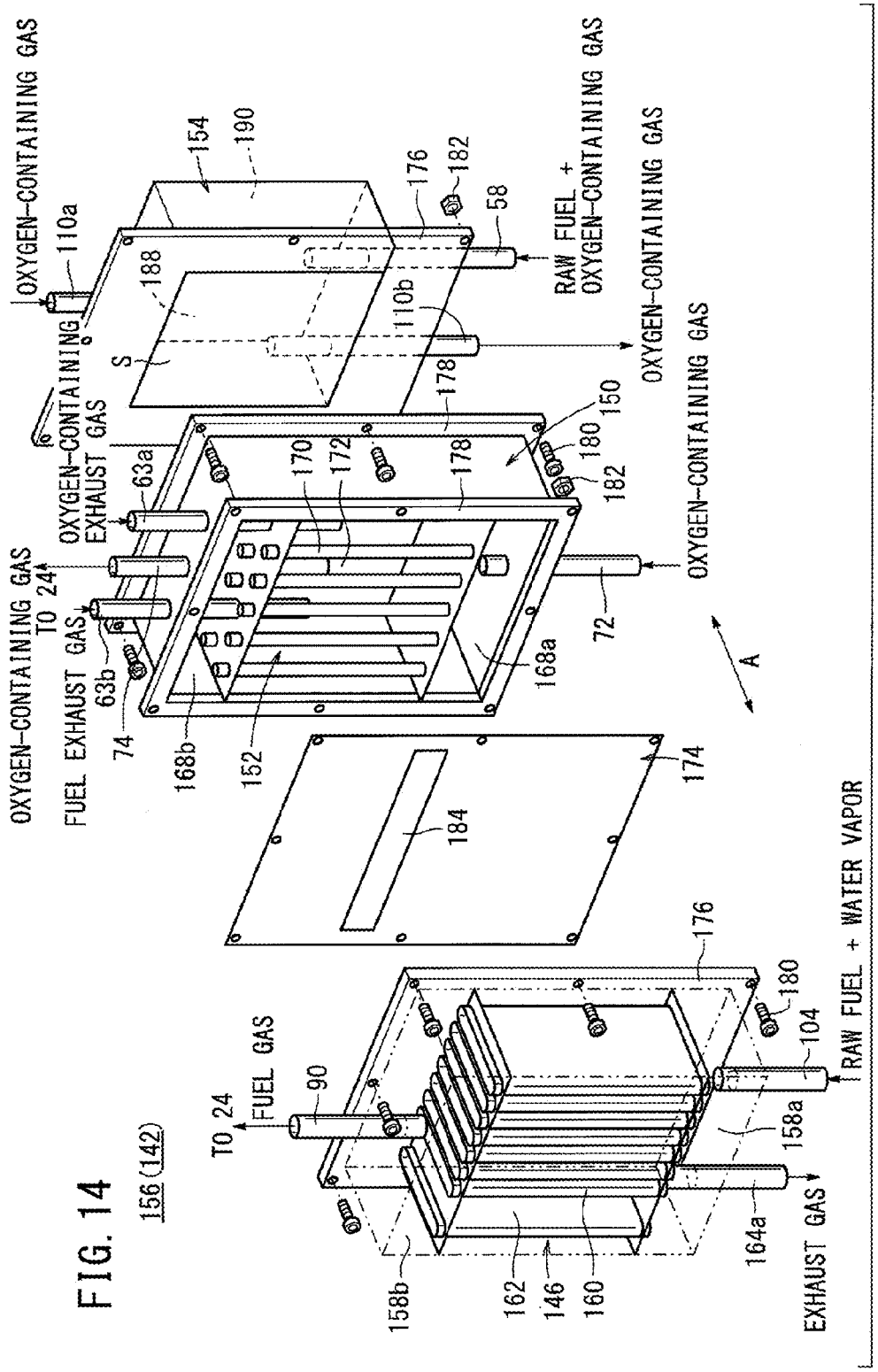
FIG. 14 is an exploded perspective view schematically showing main components of the FC peripheral equipment.

As shown in FIGS. 12 to 14, the heat exchanger 150 is provided upright for allowing the oxygen-containing gas to flow vertically from the lower position to the upper position as described later. The reformer 146 is provided upright for allowing the reformed gas to flow vertically from the lower position to the upper position. The start-up combustor 154 is directly attached to one side (one end) of the heat exchanger 150, and the reformer 146 is directly attached to the other side (other end) of the heat exchanger 150. The reformer 146, the heat exchanger 150 (including the exhaust gas combustor 152), and the start-up combustor 154 are stacked in the horizontal direction indicated by an arrow A. As shown in FIG. 12, the evaporator 148 and a desulfurizer 108 are provided below the heat exchanger 150 and the reformer 146.

As shown in FIG. 11, a raw fuel channel 104 is connected to an outlet of the desulfurizer 108, and the raw fuel channel 104 is connected to a reformed gas supply chamber 158a of the reformer 146. As shown in FIGS. 13 and 14, the reformed gas supply chamber 158a is connected to lower ends of a plurality of reforming pipes 160, and a reformed gas discharge chamber 158b is connected to upper ends of the reforming pipes 160. One end of the fuel gas channel 90 is connected to the reformed gas discharge chamber 158b. The other end of the fuel gas channel 90 is connected to the fuel gas supply passage 44a of the fuel cell stack 24 (see FIG. 11). Each of the reforming pipes 160 is filled with reforming catalyst pellets (not shown).

A heating space 162 is formed between the reforming pipes 160. One end of an exhaust gas pipe 164a is opened to the heating space 162, and as shown in FIG. 11, the other end of the exhaust gas pipe 164a is connected to an inlet of a heating channel 166 of the evaporator 148. An exhaust gas pipe 164b is connected to an outlet of the heating channel 166 of the evaporator 148.

As shown in FIG. 14, an oxygen-containing gas supply chamber 168a is provided on the lower side of the heat exchanger 150, and an oxygen-containing gas discharge chamber 168b is provided on the upper side of the heat exchanger 150. A plurality of oxygen-containing gas pipes 170 are connected to the oxygen-containing gas supply chamber 168a and the oxygen-containing gas discharge chamber 168b at both ends.

One end of the oxygen-containing gas supply pipe 72 is provided in the oxygen-containing gas supply chamber 168a. One end of the oxygen-containing gas channel 74 is provided in the oxygen-containing gas discharge chamber 168b, and the other end of the oxygen-containing gas channel 74 is connected to the oxygen-containing gas supply passage 42a of the fuel cell stack 24 (see FIG. 11).

A combustion chamber 172 of the exhaust gas combustor 152 is provided in the heat exchanger 150, as a space containing the plurality of oxygen-containing gas pipes 170. The combustion chamber 172 functions as a heat source for raising the temperature of the oxygen-containing gas by combustion reaction of the fuel gas (specifically, the fuel exhaust gas) and the oxygen-containing gas (specifically, the oxygen-containing exhaust gas). One end of the oxygen-containing exhaust gas channel 63a and one end of the fuel exhaust gas channel 63b are connected to the combustion chamber 172 through the oxygen-containing gas discharge chamber 168b.

As shown in FIG. 14, a wall plate (wall) 174 is provided between the reformer 146 and the heat exchanger 150. The wall plate 174 is sandwiched between a flange 176 of the reformer 146 and a flange 178 of the heat exchanger 150, and these components are fixed together using a plurality of bolts 180 and nuts 182. An opening 184 is formed in the wall plate 174 for supplying the combustion gas produced in the combustion chamber 172 of the heat exchanger 150 to the heating space 162 of the reformer 146.

Figure 15:
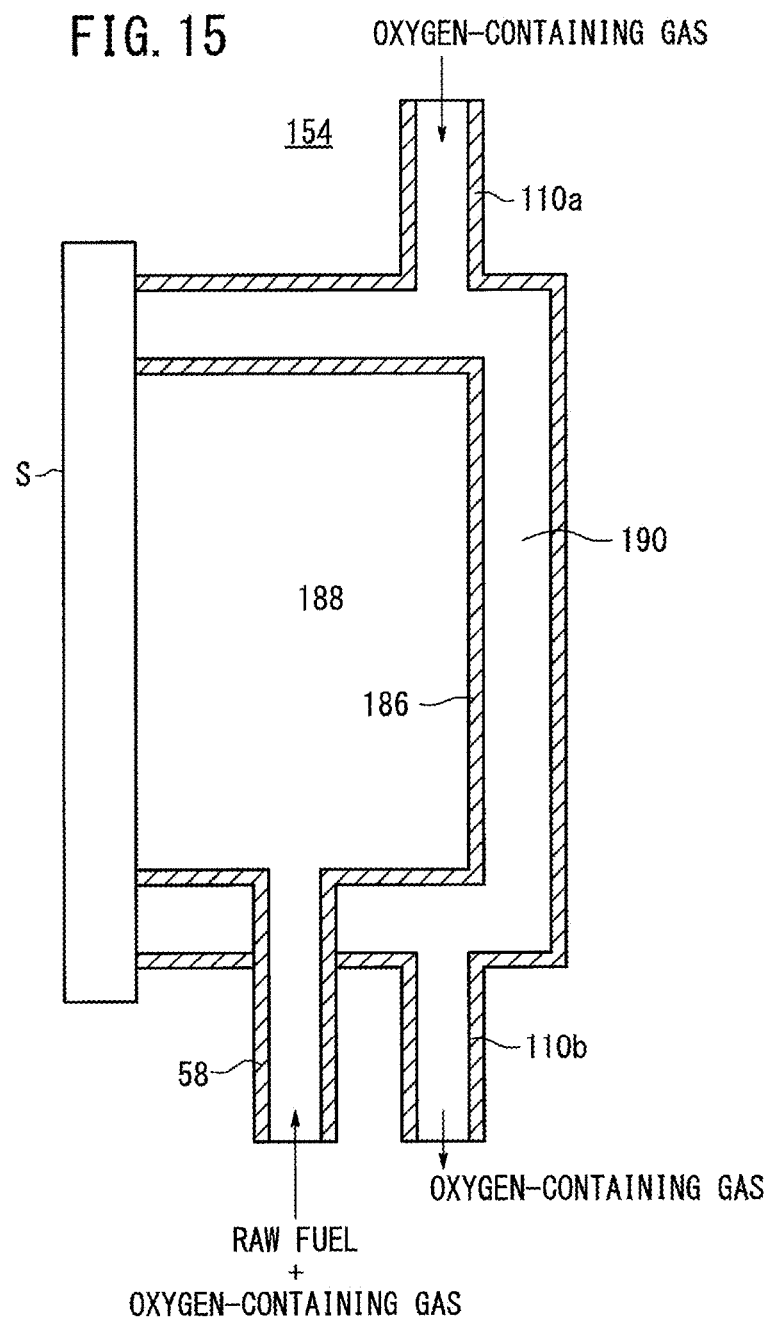
FIG. 15 is a side view partially in cross section showing a start-up combustor of the FC peripheral equipment.
Figure 16:
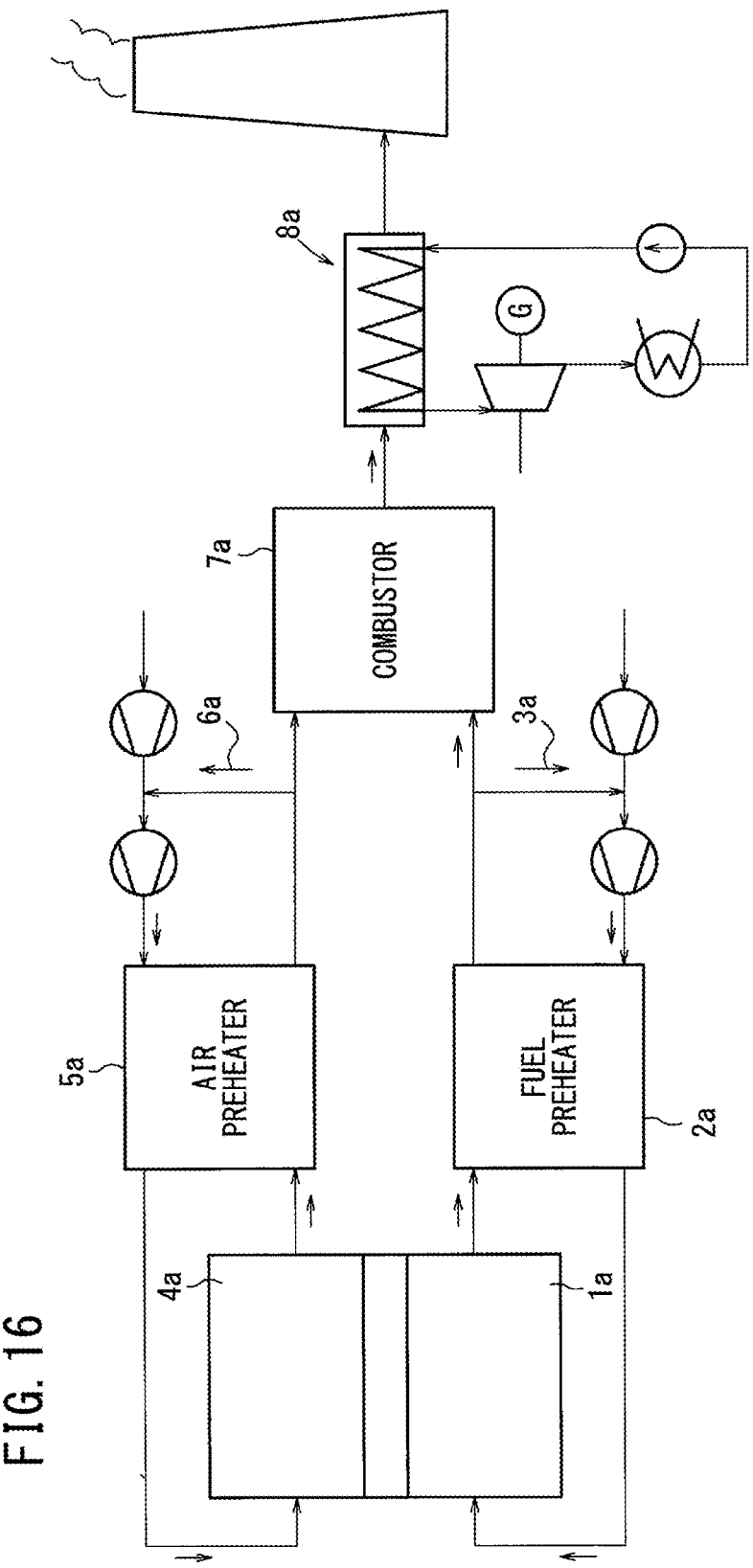
FIG. 16 is a diagram schematically showing a fuel cell power generation system disclosed in the conventional technique 1.
Figure 17:
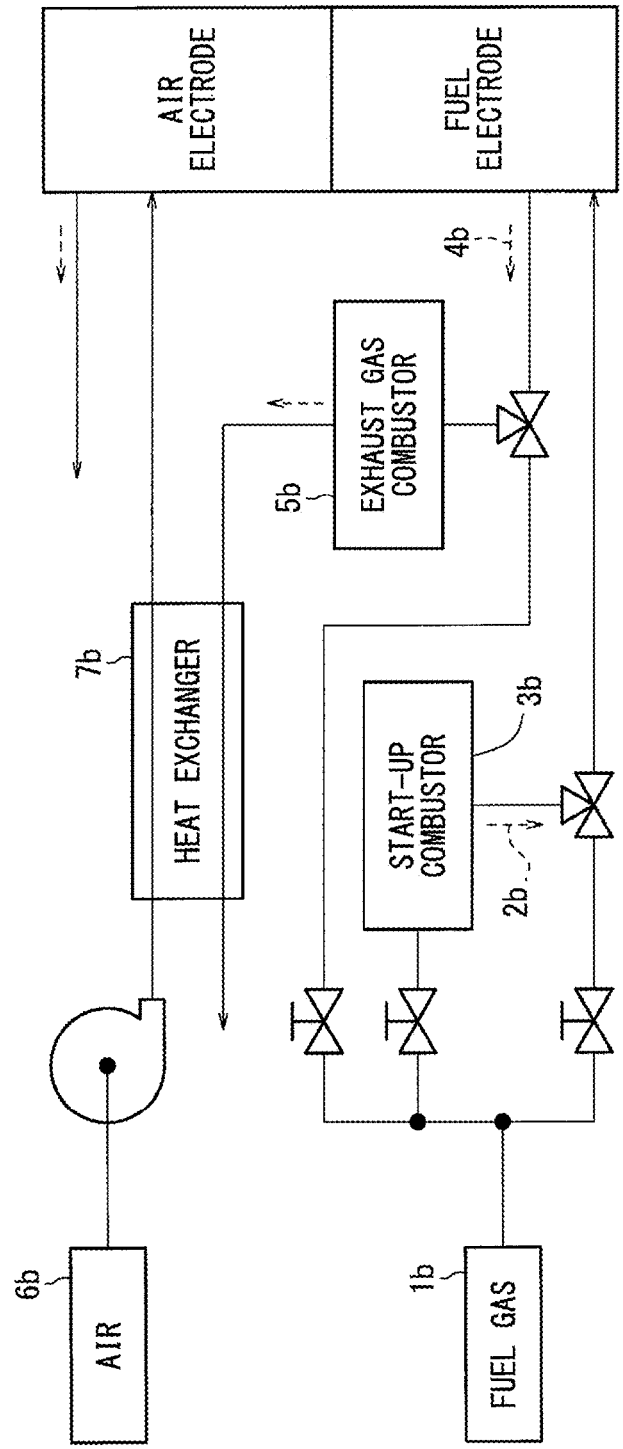
FIG. 17 is a diagram schematically showing a fuel cell system disclosed in the conventional technique 2.
Figure 18:
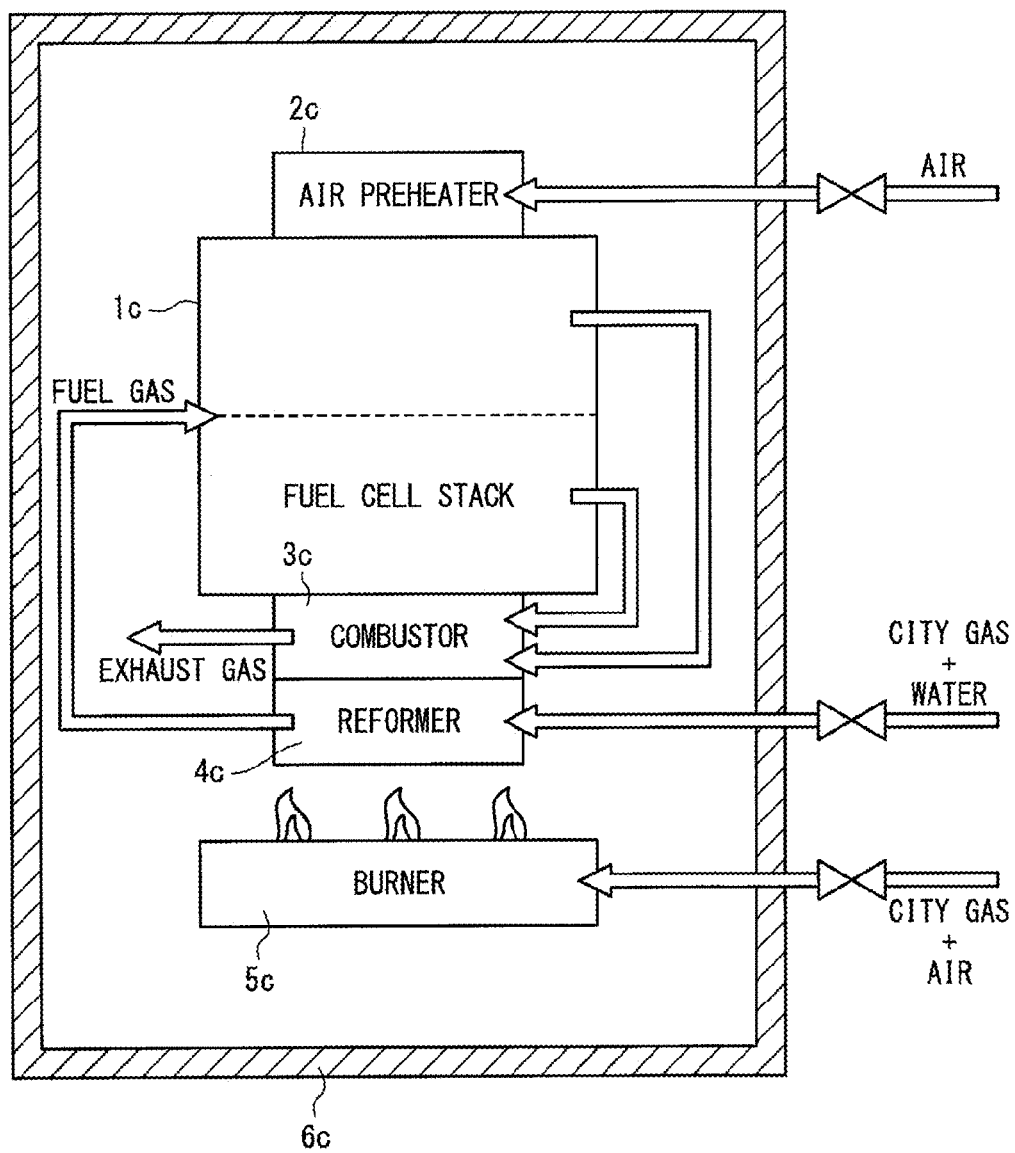
FIG. 18 is a diagram showing a fuel cell disclosed in the conventional technique 3.

As shown in FIG. 15, a combustion chamber 188 is formed in the start-up combustor 154 through an internal casing 186, and a coolant channel 190 is formed outside the internal casing 186 for cooling the combustion chamber 188. A first oxygen-containing gas channel 110a of the oxygen-containing gas supply apparatus 16 is connected to an upper part of the coolant channel 190, and a second oxygen-containing gas channel 110b of the oxygen-containing gas supply apparatus 16 is connected to a lower part of the coolant channel 190 (see FIG. 11).

The combustion chamber 188 includes a rectangular flaming area S in correspondence with the combustion chamber 172 of the exhaust gas combustor 152 (see FIG. 14). The raw fuel supply pipe 58 is connected to the combustion chamber 188. As shown in FIG. 14, the flange 176 of the start-up combustor 154 and the flange 178 of the heat exchanger 150 are fixed together using the plurality of bolts 180 and nuts 182.

Operation of the fuel cell system 140 will be described below.

At the time of starting operation of the fuel cell system 140, the air (oxygen-containing gas) and the raw fuel are supplied to the start-up combustor 154. Specifically, in the oxygen-containing gas supply apparatus 16, by operation of the air pump, the air is supplied to the first oxygen-containing gas channel 110a. The air flows through the coolant channel 190 of the start-up combustor 154 into the second oxygen-containing gas channel 110b, and then, by operation of adjusting the opening angle of the oxygen-containing gas regulator valve 112, the oxygen-containing gas is supplied from the second oxygen-containing gas channel 110b to the air supply pipe 57.

In the raw fuel supply apparatus 14, by operation of the fuel gas pump, the raw fuel is supplied to the upstream side of the raw fuel channel 104. By operation of adjusting the opening angle of the raw fuel regulator valve 106, the raw fuel flows into the raw fuel supply pipe 58. The raw fuel is supplied to the air supply pipe 57, mixed with the air, and supplied to the combustion chamber 188 of the start-up combustor 154.

Thus, the mixed gas of the raw fuel and the air is supplied to the combustion chamber 188, and the mixed gas is ignited to start combustion. In the structure, in the heat exchanger 150 directly connected to the start-up combustor 154, as shown in FIG. 14, the combustion gas is supplied from the flaming area S of the start-up combustor 154 to the combustion chamber 172 of the exhaust gas combustor 152.

The combustion gas supplied to the combustion chamber 172 heats the heat exchanger 150, and moves to the heating space 162 of the reformer 146 through the opening 184 formed in the wall plate 174. Thus, the reformer 146 is heated. The exhaust gas pipe 164a is provided in the heating space 162, and the exhaust gas pipe 164a is connected to the heating channel 166 of the evaporator 148. Therefore, as shown in FIG. 11, after the combustion gas is used for increasing the temperature of the evaporator 148, the combustion gas is discharged from the exhaust gas pipe 164b.

Then, the opening angle of the oxygen-containing gas regulator valve 112 is adjusted to increase the amount of the air supplied to the oxygen-containing gas supply pipe 72, and the opening angle of the raw fuel regulator valve 106 is adjusted to increase the amount of the raw fuel supplied to the raw fuel supply pipe 58. Therefore, the amount of combustion in the start-up combustor 154 is increased, and the quantity of the produced heat is increased. In the water supply apparatus 18, the amount of water supplied to the evaporator 148 is adjusted.

Then, the opening angle of the oxygen-containing gas regulator valve 112 is adjusted to decrease the amount of the air supplied to the air supply pipe 57, and the opening angle of the raw fuel regulator valve 106 is adjusted to decrease the amount of raw fuel supplied to the raw fuel supply pipe 58. Thus, the amount of combustion in the start-up combustor 154 is decreased, and the quantity of the produced heat is decreased. In the water supply apparatus 18, the amount of water supplied to the evaporator 148 is adjusted.

Thus, in the oxygen-containing gas supply apparatus 16, the flow rate of the air supplied to the oxygen-containing gas supply pipe 72 is increased by the oxygen-containing gas regulator valve 112, and the air flows into the oxygen-containing gas supply chamber 168a of the heat exchanger 150.

As shown in FIG. 14, the air supplied into the oxygen-containing gas supply chamber 168a is heated by the combustion gas which has been supplied into the combustion chamber 172 (heat exchange between the air and the combustion gas occurs) while the air is moving from the lower end to the upper end of the oxygen-containing gas pipes 170. The heated air is temporarily supplied to the oxygen-containing gas discharge chamber 168b, and then, the air is supplied to the oxygen-containing gas supply passage 42a of the fuel cell stack 24 through the oxygen-containing gas channel 74 (see FIG. 11).

In the fuel cell stack 24, after the heated air flows through the oxygen-containing gas flow field 38, the air is discharged from the oxygen-containing gas discharge passage 42b to the oxygen-containing exhaust gas channel 63a. As shown in FIG. 14, the oxygen-containing exhaust gas channel 63a is opened to the combustion chamber 172 of the exhaust gas combustor 152, and the air is supplied into the combustion chamber 172.

Further, in the raw fuel supply apparatus 14, as shown in FIG. 11, the flow rate of raw fuel supplied from the raw fuel channel 104 to the desulfurizer 108 is increased via the raw fuel regulator valve 106. After sulfur is removed from the raw fuel in the desulfurizer 108, the raw fuel is supplied to the reformed gas supply chamber 158a of the reformer 146. In the meanwhile, the water supplied from the water supply apparatus 18 is vaporized by the evaporator 148. Then, the water vapor flows through the raw fuel channel 104, and then, the water vapor is supplied to the reformed gas supply chamber 158a.

As shown in FIG. 13, the mixed gas of the raw fuel and the water vapor supplied to the reformed gas supply chamber 158a flows inside the plurality of reforming pipes 160 from the lower end to the upper end. In the meanwhile, the mixed gas is heated by the combustion gas supplied into the heating space 162, and steam reforming is induced by catalyst pellets. After hydrocarbon of $C_{2+}$ is removed (reforming of the mixed gas is performed), a reformed gas chiefly containing methane is obtained. The reformed gas is temporarily supplied to the reformed gas discharge chamber 158b as a heated fuel gas, and then, supplied to the fuel gas supply passage 44a of the fuel cell stack 24 through the fuel gas channel 90 (see FIG. 11).

In the fuel cell stack 24, after the heated fuel gas flows through the fuel gas flow field 40, the fuel gas is discharged into the fuel exhaust gas channel 63b from the fuel gas discharge passage 44b. As shown in FIG. 14, the fuel exhaust gas channel 63b is opened to the combustion chamber 172 of the exhaust gas combustor 152, and the fuel gas is supplied into the combustion chamber 172. The heated air and the heated fuel gas flow through the fuel cell stack 24 to increase the temperature of the fuel cell stack 24.

The air is supplied to the combustion chamber 172 of the exhaust gas combustor 152 through the oxygen-containing exhaust gas channel 63a, and the fuel gas is supplied to the combustion chamber 172 through the fuel exhaust gas channel 63b. Therefore, by heating operation of the start-up combustor 154, when the temperature of the fuel gas in the exhaust gas combustor 152 exceeds the self-ignition temperature, combustion of the air and the fuel gas is started in the combustion chamber 172.

When combustion in the exhaust gas combustor 152 is started, the opening angle of the oxygen-containing gas regulator valve 112 and the opening angle of the raw fuel regulator valve 106 are adjusted, and the supply of the air and the raw fuel to the start-up combustor 154 is stopped. Further, power generation by the fuel cell stack 24 is started.

In the third embodiment, the control device 20 is provided, and the fuel cell system 140 is controlled in the same manner as in the cases of the first and second embodiments. In this manner, the combustion apparatus 55 and the fuel cell stack 24 are kept within the optimum operating temperature range, and improvement in the thermally self-sustaining operation is achieved. Further, the same advantages as in the cases of the first and second embodiments are obtained. For example, since the fuel exhaust gas and the oxygen-containing exhaust gas are not discharged from the combustion apparatus 55 directly, the adverse effect on the environment can be prevented as much as possible.

While the invention has been particularly shown and described with reference to preferred embodiments, it will be understood that variations and modifications can be effected thereto by those skilled in the art without departing from the scope of the invention as defined by the appended claims.

The invention claimed is:

1. A fuel cell system comprising:
   a fuel cell stack formed by stacking a plurality of fuel cells for generating electrical energy by electrochemical reactions of a fuel gas and an oxygen-containing gas;
   a heat exchanger for raising a temperature of the oxygen-containing gas by heat exchange with a combustion gas, and supplying the oxygen-containing gas to the fuel cell stack;
   a combustion apparatus including an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas and a start-up combustor for combusting the fuel gas or raw fuel to be reformed into the fuel gas and the oxygen-containing gas to produce the combustion gas; and
   a control device for controlling an amount of the electrical energy generated in the fuel cell stack,
   wherein the control device includes:
   a combustion apparatus temperature comparison unit for comparing a temperature of the exhaust gas combustor during power generation of the fuel cell stack and a predetermined combustion apparatus temperature range;
   a combustion apparatus flame-out determination unit for determining whether flame-out occurs in the exhaust gas combustor based on a comparison result by the combustion apparatus temperature comparison unit; and
   a combustion apparatus control unit for starting or stopping operation of the start-up combustor based on a determination result by the combustion apparatus flame-out determination unit.

2. The fuel cell system according to claim 1, wherein the control device includes:
   a fuel cell stack temperature comparison unit for comparing a temperature of the fuel cell stack and a predetermined fuel cell stack temperature range; and
   a fuel cell stack power generation determination unit for determining whether the fuel cell stack has a temperature where power generation of the fuel cell stack can be performed based on a comparison result by the fuel cell stack temperature comparison unit,
   wherein the combustion apparatus control unit starts or stops operation of the start-up combustor based on a determination result by the fuel cell stack power generation determination unit.

3. The fuel cell system according to claim 1, wherein the control device includes:
   a fuel cell stack temperature comparison unit for comparing a temperature of the fuel cell stack and a predetermined fuel cell stack temperature range; and
   a fuel cell stack power generation determination unit for determining whether the fuel cell stack has a temperature where power generation of the fuel cell stack can be performed based on a comparison result by the fuel cell stack temperature comparison unit,
   wherein when the combustion apparatus temperature comparison unit detects that a temperature of the exhaust gas combustor is less than a minimum setting temperature, and the fuel cell stack temperature comparison unit detects that a temperature of the fuel cell stack is a maximum setting temperature or less, the combustion apparatus control unit starts operation of the start-up combustor.

4. The fuel cell system according to claim 1, wherein the control device includes:
   a fuel cell stack temperature comparison unit for comparing a temperature of the fuel cell stack and a predetermined fuel cell stack temperature range; and
   a fuel cell stack power generation determination unit for determining whether the fuel cell stack has a temperature where power generation of the fuel cell stack can be performed based on a comparison result by the fuel cell stack temperature comparison unit,
   wherein when the combustion apparatus temperature comparison unit detects that a temperature of the exhaust gas combustor is between a minimum setting temperature and a maximum setting temperature, and the fuel cell stack temperature comparison unit detects that a temperature of the fuel cell stack is less than a minimum setting temperature, the combustion apparatus control unit starts operation of the start-up combustor.

5. The fuel cell system according to claim 1, wherein the control device includes:
   a fuel cell stack temperature comparison unit for comparing a temperature of the fuel cell stack and a predetermined fuel cell stack temperature range; and
   a fuel cell stack power generation determination unit for determining whether the fuel cell stack has a temperature where power generation of the fuel cell stack can be performed based on a comparison result by the fuel cell stack temperature comparison unit,
   wherein when the combustion apparatus temperature comparison unit detects that a temperature of the exhaust gas combustor is between a minimum setting temperature and a maximum setting temperature, and the fuel cell stack temperature comparison unit detects that a temperature of the fuel cell stack exceeds a maximum setting temperature, the control device increases a flow rate of the oxygen-containing gas supplied to the fuel cell stack, or decreases a flow rate of the fuel gas supplied to the fuel cell stack.

6. The fuel cell system according to claim 1, wherein the control device includes:
   a fuel cell stack temperature comparison unit for comparing a temperature of the fuel cell stack and a predetermined fuel cell stack temperature range; and
   a fuel cell stack power generation determination unit for determining whether the fuel cell stack has a temperature where power generation of the fuel cell stack can be performed based on a comparison result by the fuel cell stack temperature comparison unit,
   wherein when the combustion apparatus temperature comparison unit detects that a temperature of the exhaust gas combustor exceeds a maximum setting temperature, and the fuel cell stack temperature comparison unit detects that a temperature of the fuel cell stack exceeds a maximum setting temperature, the control device increases a flow rate of the oxygen-containing gas supplied to the fuel cell stack, or decreases a flow rate of the fuel gas supplied to the fuel cell stack.

7. The fuel cell system according to claim 1, wherein the control device includes:
   a fuel cell stack temperature comparison unit for comparing a temperature of the fuel cell stack and a predetermined fuel cell stack temperature range; and
   a fuel cell stack power generation determination unit for determining whether the fuel cell stack has a temperature where power generation of the fuel cell stack can be performed based on a comparison result by the fuel cell stack temperature comparison unit,
   wherein when the combustion apparatus temperature comparison unit detects that a temperature of the exhaust gas combustor exceeds a maximum setting temperature, and the fuel cell stack temperature comparison unit detects that a temperature of the fuel cell stack exceeds a maximum setting temperature, the control device decreases a flow rate of the fuel gas supplied to the fuel cell stack, or increase the amount of electrical energy generated in the fuel cell stack.

8. The fuel cell system according to claim 1, wherein the fuel cell stack is a solid oxide fuel cell stack.

9. A method of controlling a fuel cell system, the fuel cell system comprising:
   a fuel cell stack formed by stacking a plurality of fuel cells for generating electrical energy by electrochemical reactions of a fuel gas and an oxygen-containing gas;
   a heat exchanger for raising a temperature of the oxygen-containing gas by heat exchange with a combustion gas, and supplying the oxygen-containing gas to the fuel cell stack;
   a combustion apparatus including an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas and a start-up combustor for combusting the fuel gas or raw fuel to be reformed into the fuel gas and the oxygen-containing gas to produce the combustion gas; and
   a control device for controlling an amount of the electrical energy generated in the fuel cell stack,
   the method comprising:
   a combustion apparatus temperature comparing step of comparing a temperature of the exhaust gas combustor during power generation of the fuel cell stack and a predetermined combustion apparatus temperature range;
   a combustion apparatus flame-out determining step of determining whether flame-out occurs in the exhaust gas combustor based on a comparison result obtained in the combustion apparatus temperature comparing step; and
   a start-up combustor controlling step of starting or stopping operation of the start-up combustor based on a determination result obtained in the combustion apparatus flame-out determining step.

10. The control method according to claim 9, further comprising:
    a fuel cell stack temperature comparing step of comparing a temperature of the fuel cell stack and a predetermined fuel cell stack temperature range; and
    a fuel cell stack power generation determining step of determining whether the fuel cell stack has a temperature where power generation of the fuel cell stack can be performed based on a comparison result obtained in the fuel cell stack temperature comparing step,
    wherein in the start-up combustor controlling step, the operation of the start-up combustor is started or stopped based on a determination result obtained in the fuel cell stack power generation determining step.

11. The control method according to claim 10, wherein when it is detected that a temperature of the exhaust gas combustor is less than a minimum setting temperature in the combustion apparatus temperature comparing step and it is detected that a temperature of the fuel cell stack is a maximum setting temperature or less in the fuel cell stack temperature comparing step, the operation of the start-up combustor is started in the start-up combustor controlling step.

12. The control method according to claim 10, wherein when it is detected that a temperature of the exhaust gas combustor is between a minimum setting temperature and a maximum setting temperature in the combustion apparatus temperature comparing step and it is detected that a temperature of the fuel cell stack is less than a minimum setting temperature, the operation of the start-up combustor is started in the start-up combustor controlling step.

13. The control method according to claim 10, wherein when it is detected that a temperature of the exhaust gas combustor is between a minimum setting temperature and a maximum setting temperature in the combustion apparatus temperature comparing step and it is detected that a temperature of the fuel cell temperature exceeds a maximum setting temperature in the fuel cell stack temperature comparing step, a flow rate of the oxygen-containing gas supplied to the fuel cell stack is increased, or a flow rate of the fuel gas supplied to the fuel cell stack is decreased.

14. The control method according to claim 10, wherein when it is detected that a temperature of the exhaust gas combustor exceeds a maximum setting temperature in the combustion apparatus temperature comparing step and it is detected that a temperature of the fuel cell stack exceeds a maximum setting temperature in the fuel cell stack temperature comparing step, a flow rate of the oxygen-containing gas supplied to the fuel cell stack is increased, or a flow rate of the fuel gas supplied to the fuel cell stack is decreased.

15. The control method according to claim 10, wherein when it is detected that a temperature of the exhaust gas combustor exceeds a maximum setting temperature in the combustion apparatus temperature comparing step and it is detected that a temperature of the fuel cell stack exceeds a maximum setting temperature in the fuel cell stack temperature comparing step, a flow rate of the fuel gas supplied to the fuel cell stack is decreased, or the amount of electrical energy generated in the fuel cell stack is increased.

16. The control method according to claim 9, wherein the fuel cell stack is a solid oxide fuel cell stack.

\* \* \* \* \*